(12) United States Patent (10) Patent No.: US 8,670,890 B2
Fournier et al. (45) Date of Patent: Mar. 11, 2014

(54) METHOD AND SYSTEM FOR TIMETABLE OPTIMIZATION UTILIZING ENERGY CONSUMPTION FACTORS

(71) Applicant: General Electric Company, Schenectady, NY (US)

(72) Inventors: David Fournier, Paris (FR); Denis Mulard, Paris (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/676,279

(22) Filed: Nov. 14, 2012

(65) Prior Publication Data

US 2014/0012454 A1 Jan. 9, 2014

Related U.S. Application Data

(60) Provisional application No. 61/669,230, filed on Jul. 9, 2012.

(51) Int. Cl.
*G05D 3/00* (2006.01)

(52) U.S. Cl.
USPC .............................................. 701/23; 701/20

(58) Field of Classification Search
USPC ..................................................... 701/20, 23
See application file for complete search history.

(56) References Cited

U.S. PATENT DOCUMENTS 6,980,894 B1 * 12/2005 Gordon et al. .................. 701/20

OTHER PUBLICATIONS

Albrecht, "Reducing power peaks and energy consumption in rail transit systems by simultaneous train running time control", Computers in Railways IX, pp. 886-894, Wessex Institute of Technology, 2004.

Chen et al., "Optimization of an MRT Train Schedule:Reducing Maximum Traction Power by Using Genetic Algorithms", IEEE Transactions on Power Systems, vol. 20, No. 3, Aug. 2005.

Kim et al., "A Mathematical Approach for Reducing the Maximum Traction Energy: The Case of Korean MRT Trains", IMECS, Mar. 17-19, 2010.

Nasri et al., "Timetable Optimization for Maximum Usage of Regenerative Energy of Braking in Electrical Railway Systems", SPEEDAM 2010 International Symposium on Power Electronics, Electrical Drives, Automation and Motion, pp. 1218-1221, 2010.

Kim et al., "A Model and Approaches for Synchronized Energy Saving in Timetabling", 9th World Congress on Railway Research May 22-26, 2011.

* cited by examiner

*Primary Examiner* — Mary Cheung
*Assistant Examiner* — Yuen Wong
(74) *Attorney, Agent, or Firm* — GE Global Patent Operation; John A. Kramer

(57) ABSTRACT

Embodiments relate to systems and methods for synchronizing two or more railway assets to optimize energy consumption. For example, an embodiment of the present invention provides receipt of a timetable associated with two or more vehicles and at least one terminal. The timetable can be modified to create a modified timetable that overlaps a brake time for a first vehicle and an acceleration time for a second vehicle, wherein at least one of a departure time or a dwell time is modified. Furthermore, the second vehicle can transfer energy from the first vehicle based upon at least one of the modified timetable and the brake time overlapping with the acceleration time.

20 Claims, 10 Drawing Sheets

METHOD AND SYSTEM FOR TIMETABLE OPTIMIZATION UTILIZING ENERGY CONSUMPTION FACTORS

CROSS-REFERENCE TO RELATED APPLICATIONS

This application claims the benefit of U.S. Provisional Application Ser. No. 61/669,230, filed Jul. 9, 2012. The entirety of the aforementioned application is incorporated herein by reference.

BACKGROUND

1. Technical Field

Embodiments of the subject matter disclosed herein relate to vehicle scheduling and control. Other embodiments relate to synchronizing two or more railway assets to optimize energy consumption.

2. Discussion of Art

In light of various economic and environmental factors, the transportation industry has strived for solutions regarding sustainable energy as well as, or in the alternative, energy conservation. Conventional solutions include hardware such as, for instance, fly-wheels or super batteries, which alleviate the sustainable energy and/or energy conservation. Such hardware can be costly not only for the specific cost of the hardware but the cost routine maintenance thereof.

It may be desirable to have a system and method for managing energy systems that differ from those that are currently available.

BRIEF DESCRIPTION

In one embodiment, a system is provided. The system includes a first component configured to receive a timetable associated with two or more vehicles and at least one terminal. The system further includes a second component configured to modify at least one of a departure time of a vehicle or a dwell time of a vehicle to create a modified timetable that overlaps a brake time for a first vehicle and an acceleration time for a second vehicle.

In one embodiment, a system is provided. The system includes a timetable associated with a first vehicle, a second vehicle, and a terminal, in which the timetable is a schedule of a time that the first vehicle and the second vehicle are at least one of arriving or departing the terminal. The system further includes a modify component configured to adjust the timetable to synchronize a brake duration of the first vehicle with an acceleration duration of the second vehicle for the terminal.

In one embodiment, a method is provided. The method includes receiving a default timetable in an offline mode associated with a time schedule for two or more vehicles and at least one location. The method further includes adjusting the default timetable by modifying at least one of a departure time of a vehicle, a dwell time of a vehicle, or a speed profile of a vehicle to estimate an overlap for a brake time for a first vehicle and an acceleration time for a second vehicle in the offline mode. The method further includes employing the modified default timetable in real time for the two or more vehicles and the location. The method further includes transferring a portion of energy from the first vehicle to the second vehicle based upon the modified default timetable in real time. The method further includes updating the adjusted default timetable in real time to synchronize a brake time for a vehicle and an acceleration time for a vehicle by changing at least of a departure time of a vehicle, a dwell time of a vehicle, or a speed profile of a vehicle.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
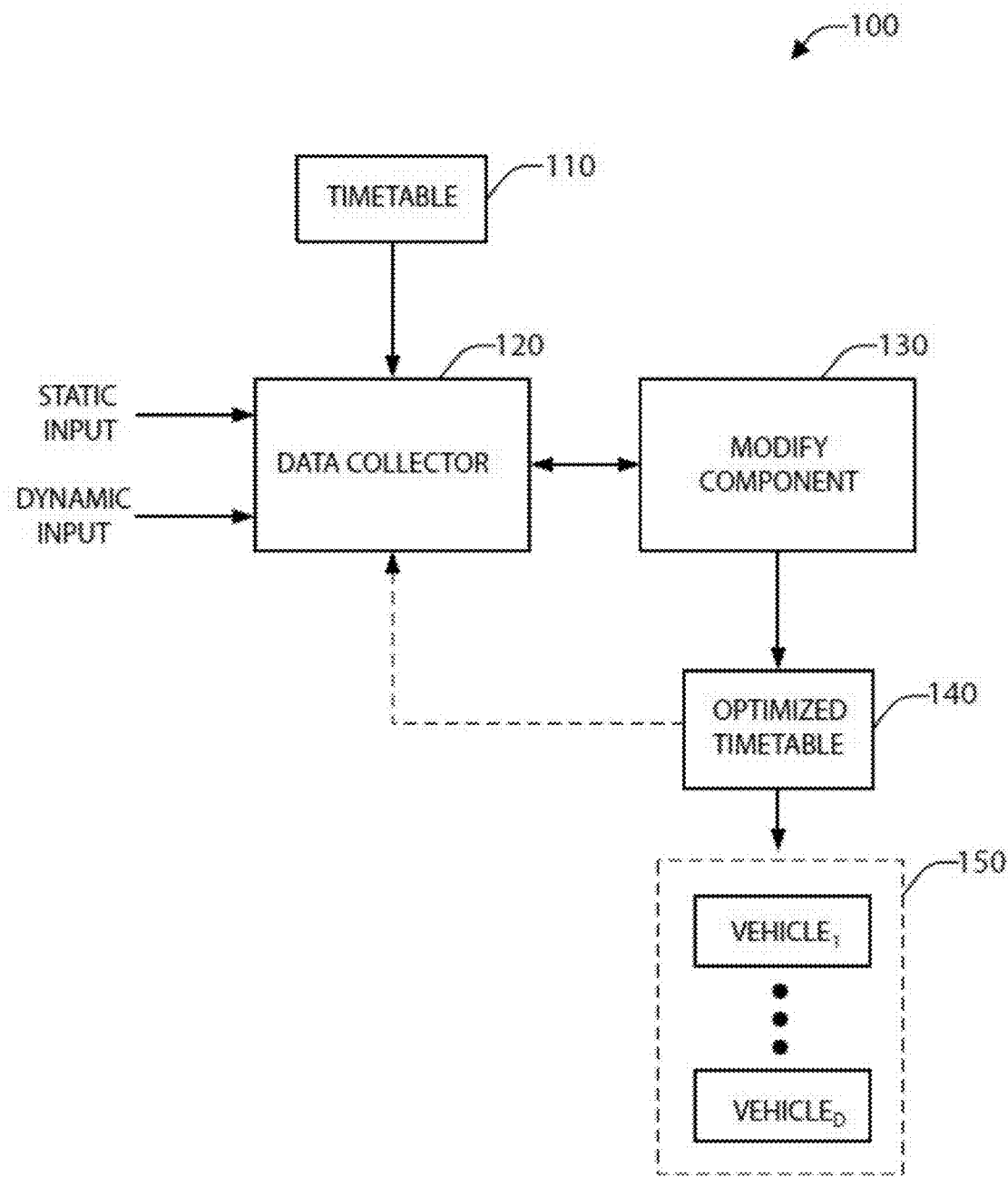
FIG. 1 is an illustration of an embodiment of a system for optimizing energy consumption by synchronizing a first vehicle and a second vehicle.

Embodiments of the present invention relate to methods and systems for synchronizing two or more vehicle (e.g., railway, among others) assets to optimize energy consumption. A timetable associated with two or more vehicles and at least one terminal can be received. The timetable can be modified to create a modified timetable that overlaps a brake time for a first vehicle and an acceleration time for a second vehicle, wherein at least one of a departure time or a dwell time is modified. Furthermore, the second vehicle can transfer energy from the first vehicle based upon at least one of the modified timetable and the brake time overlapping with the acceleration time.

With reference to the drawings, like reference numerals designate identical or corresponding parts throughout the several views. However, the inclusion of like elements in different views does not mean a given embodiment necessarily includes such elements or that all embodiments of the invention include such elements.

The term "vehicle" as used herein can be defined as any asset that is a mobile machine that transports at least one of a person, people, or a cargo. For instance, a vehicle can be, but is not limited to being, a truck, a rail car, an intermodal container, a locomotive, a marine vessel, a mining equipment, a stationary power generation equipment, an industrial equipment, a construction equipment, and the like.

It is to be appreciated that "associated with the two or more vehicles" refers to relating to one or more of the two or more vehicles.

FIG. 1 is an illustration of an exemplary embodiment of a system 100 for optimizing energy consumption by synchronizing a first vehicle and a second vehicle. The system includes a timetable 110 associated with a first vehicle, a second vehicle, and a terminal, wherein the timetable is a schedule of a time that the first vehicle and the second vehicle are at least one of arriving or departing the terminal. The time table can be aggregated by a data collector 120. Moreover, the data collector 120 can aggregate a static input and/or a dynamic input (discussed below). The system further includes a modify component 130 that optimizes the timetable 110 based upon the aggregated information and adjusts (e.g., modifies) at least one of a dwell time for a vehicle located within a terminal, a departure time for a vehicle located within a terminal, and/or a speed profile for a vehicle for a terminal. The modify component 130 generates an optimized timetable 140 (also referred to as the modified timetable), wherein the optimized timetable 140 improves energy consumption.

For example, the optimized timetable synchronizes two or more vehicles located within a terminal such that while a vehicle is braking, another vehicle is accelerating. In particular, synchronizing a first braking vehicle with a second accelerating vehicle allows a portion of energy to transfer from the first braking vehicle to the second accelerating vehicle. The system provides synchronization for two or more vehicles without any additional hardware such as super capacitors, fly-wheels, among others. The system can be computer-implemented via software such that the modify component adjusts a timetable to create the optimized timetable.

The optimized timetable or modified timetable can be implemented to two or more vehicles 150 (herein referred to as "vehicles 150"). There can be a suitable number of vehicles such as vehicle $_1$ to vehicle $_D$, where D is a positive integer. In particular, the vehicles can be automatically controlled, manually controlled (e.g., a human operator), or a combination thereof. In either event, the optimized timetable can be implemented, wherein at least one of a dwell time, a departure time, and/or a speed profile is adjusted to synchronize the vehicles. By way of example and not limitation, the vehicle can be a train, a railway vehicle, an electrical-powered vehicle, and the like.

As discussed, the system can include the data collector. The data collector can aggregate information related to a timetable, a static input, and/or a dynamic input (See DATA below). For instance, the data collector can aggregate suitable data related to the timetable, two or more vehicles, a terminal (e.g., a location, a station, etc.), and the like. By way of example and not limitation, the dynamic input can be a dwell time, a departure time, a speed profile, a portion of a timetable, among others. Moreover, for example, the static input can be, but is not limited to, a Quality of Service (QoS) constraint, a constraint, an energy model, a tolerance, an energy profile, a network topology, an electric efficiency, an origin/destination matrix, a portion of a timetable, an energy transportation, a loss of energy, among others. The static input and/or the dynamic inputs are described in more details below.

By way of example and not limitation, the system can create a timetable to provide synchronization between two or more vehicles. For instance, a timetable can be created which takes into account at least one of a security constraint, a quality of service constraint, the issue of energy consumption, and the like. In another example, the system can optimize an existing timetable for two or more vehicles. In another example, the system 100 can create a timetable for two or more vehicles as well as optimize an existing timetable for two or more disparate vehicles. For instance, two stations or terminals can include a set of vehicles respectively. The first set of vehicles for a first station can include an existing timetable that the system can modify or adjust to improve synchronization. Further, a timetable can be created for the second set of vehicles related to a second station.

Figure 2:
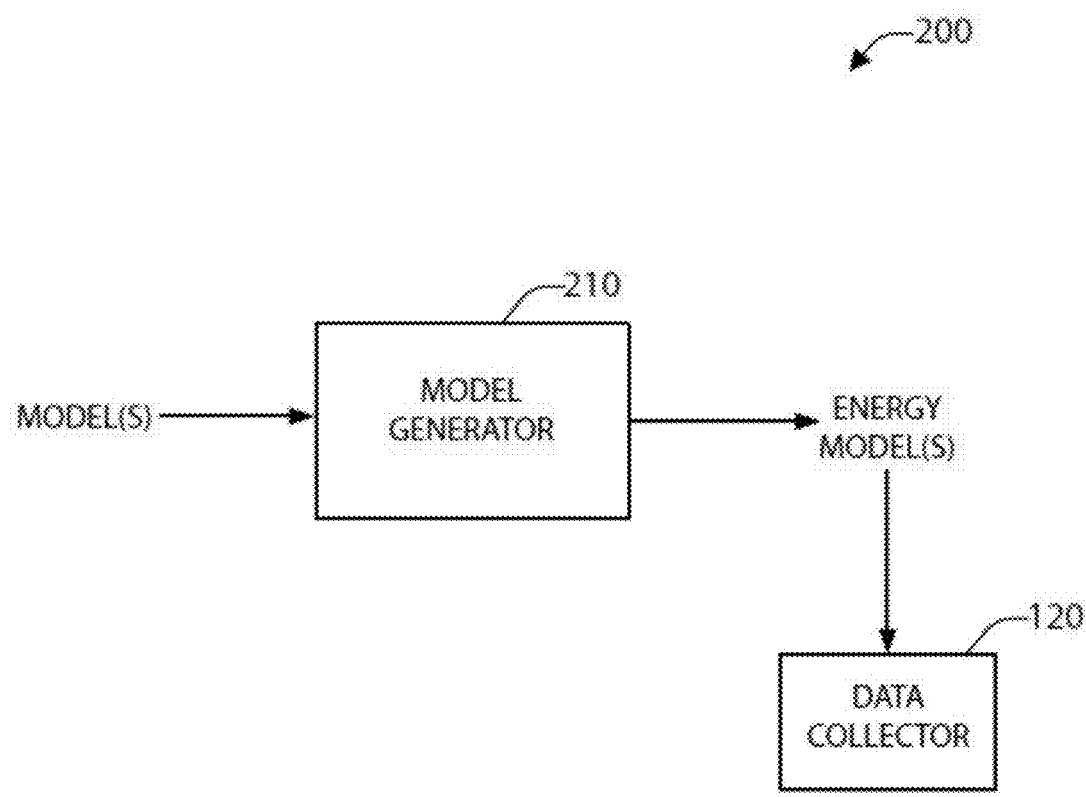
FIG. 2 is an illustration of an embodiment of a system for generating an energy model utilized to synchronize a brake time for a vehicle and an acceleration time for a vehicle.

FIG. 2 is an illustration of an exemplary embodiment of a system 200 for generating an energy model utilized to synchronize a brake time for a vehicle and an acceleration time for a vehicle. The system can include a model generator 210 that creates energy model(s) that can be collected by the data collector and further utilized by the modify component (not shown). The model generator can create a suitable model or a model with a suitable aspect to implement the optimized timetable to synchronize two or more trains for energy conservation. The below models and generation of such models are solely for example and not to be seen as limiting on the subject innovation (see MODEL ENERGY below).

The model generator can receive a model that represents a condition or characteristic associated with an environment in which two or more vehicles will be synchronized for energy conservation. For instance, the model can be or related to, but is not limited to, energy accountings, network topologies, energy transportation, ohmic resistance loss, among others. These models can be utilized to create an energy model for an environment in which two or more trains are to be synchronized with an optimized timetable by adjusting at least one of a dwell time, a departure time, and/or a speed profile.

Figure 3:
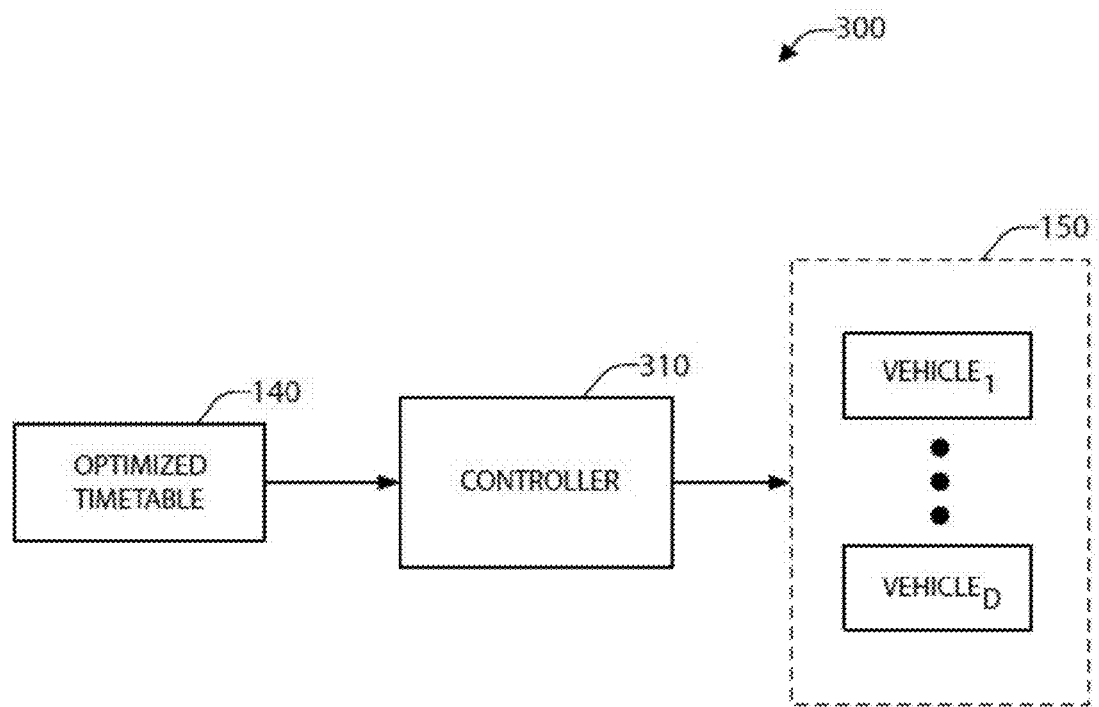
FIG. 3 is an illustration of an embodiment of a system for controlling two or more vehicles based upon an optimized timetable that conserves energy by synchronizing a first vehicle and a second vehicle.

FIG. 3 is an illustration of an exemplary embodiment of a system 300 for controlling two or more vehicles based upon an optimized timetable that conserves energy by synchronizing a first vehicle and a second vehicle. The system includes a controller 310 that can implement a control to the vehicles 150 based at least in part upon the generated optimized timetable. For instance, the controller can identify a change in a currently used timetable compared to the optimized timetable and implement such change. For instance, the controller can implement a new dwell time, a new departure time, and/or a new speed profile.

The controller can be utilized for an automatically driven vehicle (e.g., no human operator) as well as, or in the alternative, a human operated vehicle, or a combination thereof. For instance, the controller can include an automatic component (not shown) that will directly implement controls based upon a change identified in the optimized timetable. Furthermore, the controller can include a manual component (not shown) that can utilize a notification component (not shown) and/or a buffer component (not shown). The manual component can facilitate controlling a vehicle that is operated by a human. The notification component can provide a signal, a message, or an instruction to the human operator. For instance, the notification component can provide an audible signal, a visual signal, a haptic signal, and/or a suitable combination thereof. The buffer component can further include a buffer of time that can take into account a delay that occurs from a human operator receiving a notification and implementing such notification. For example, the buffer component can mitigate human delay to implement the optimized timetable.

Figure 4:
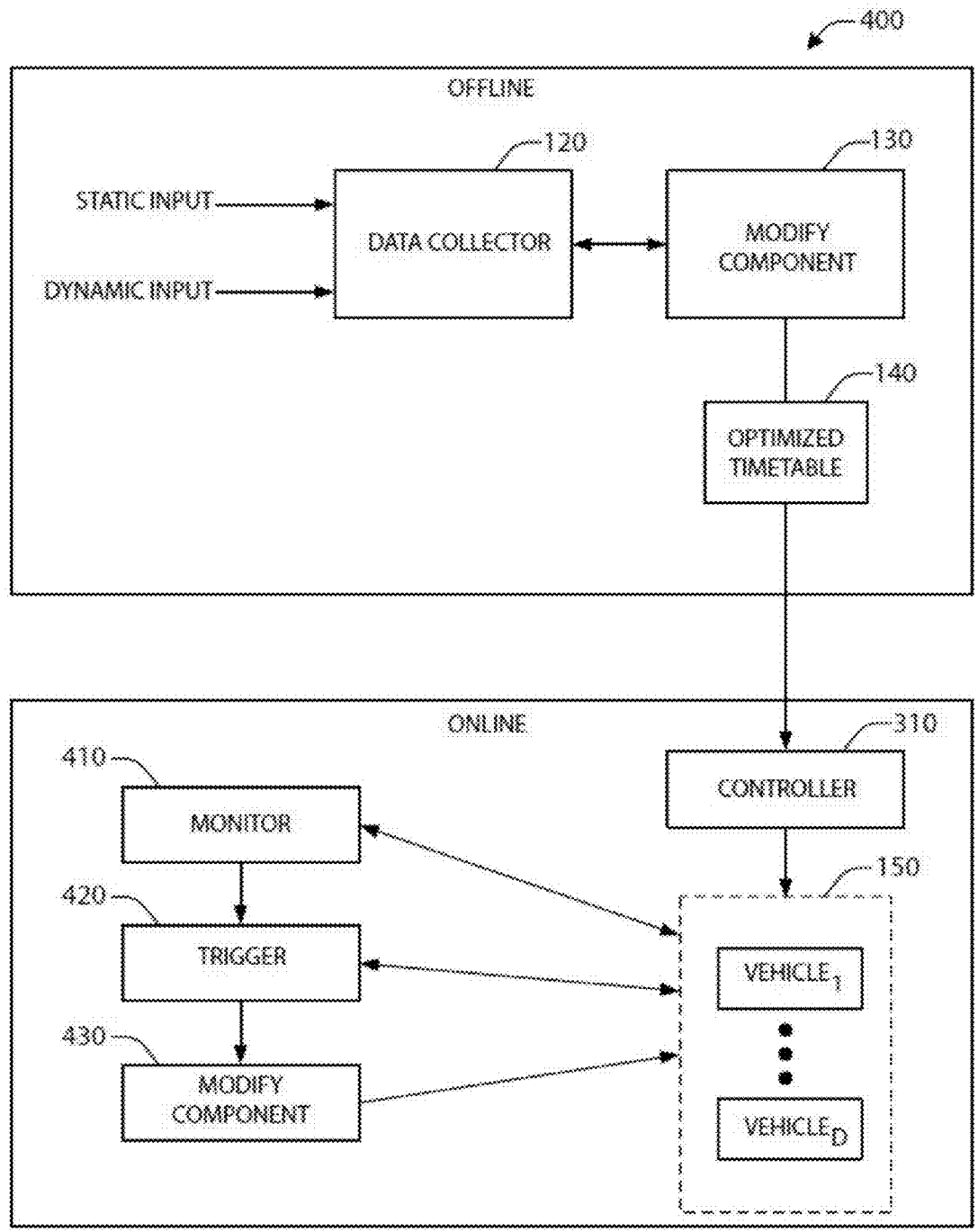
FIG. 4 is an illustration of an embodiment of a system for creating an optimized timetable offline and employing such optimized timetable online to conserve energy by synchronizing a first vehicle and a second vehicle.

FIG. 4 is an illustration of an exemplary embodiment of a system 400 for creating an optimized timetable offline and employing such optimized timetable online to conserve energy by synchronizing a first vehicle and a second vehicle. The system 400 can include an offline mode (also referred to as "offline") and an online mode (also referred to as "online"). An offline mode can indicate a test environment or a modeled environment and an online mode can indicate a real time, real physical world environment. For instance, a real terminal station with vehicles can be an online environment whereas a computer simulation can be an offline environment.

The system 400 allows a creation of an optimized timetable offline. Once the optimized timetable is created offline, the optimized timetable can be employed online. In particular, the controller can leverage the optimized timetable and implement specifics related thereto with vehicles. The online environment (also referred to as "online") can include a monitor 410, a trigger 420, and/or a modify component 430. The monitor can track the vehicles in comparison with at least one of the optimized timetable and/or a measured amount of energy (e.g., energy conserved, energy consumed, energy transferred, among others). The trigger can include threshold values or triggers that will indicate whether or not the modify component will be utilized to update the optimized timetable based on the tracked information.

The following is a description related to energy optimization of metro timetables.

Sustainable energy has been a major issue over the last years. Transportation is a major field concerned about energy consumption and the trend is to tend to optimize as much as possible the energy consumption in this industry, and in particular in mass rapid transit such as metros. Several hardware solutions, like fly-wheels or super batteries have been developed to reduce losses. However, these solutions involve buying and maintaining potentially costly material which can be difficult to economically justify.

This application can describe a method which modifies dwell times to synchronize acceleration and braking of metros. Dwell times have the advantage to be updated in real time. To do that, a genetic algorithm is used to minimize an objective function—corresponding to the global energy consumption over a time horizon—computed with a linear program.

The energy consumption in a metro line can be decreased by synchronizing braking and accelerations of metros. Indeed, an electric motor behaves as a generator when braking by transforming the kinetic energy into electrical energy. This energy, available in the third rail, has to be absorbed immediately by another metro in the neighborhood or is dissipated as heat and lost. The distance between metros which are generating energy and candidate metros induces that part of the transferred regenerative energy is lost in the third rail due to Joule's effect.

Most timetables do not take into account energy issues. The tables usually have been created to maximize quality of service, security and other constraints like drivers' shift or weekend periods for instance. It is however possible to slightly modify current timetables to include some energy optimization. Here, energy consumption of a metro line can be minimized during a given time horizon by modifying the off-line timetable.

As an example, the model can be restricted to a single metro line (no fork or loops) including 31 stations with two terminals A and B. All trips are done from A to B or B to A, stopping at all stations. The timetable, based on real data, is a bit more detailed than the one given to passengers; in addition to departure times at every station, it compiles also: 1) running times between every station; and 2) dwell times at every station.

Dwell times represent the nominal waiting time of a metro in a given station. This time can be different regarding the stations but it is considered here that every metro have the same dwell time for a given station, not depending on the hour of the day.

For every timeslot (1 second in our model), the position of metros (between which stations they are) is known and the energy they consume (positive energy or produce (negative energy). Contrary to timetables data which are real, energy data have been created following energy models. Units can be arbitrary: a value of 1 in this system corresponds to the energy consumed by a metro at full throttle during one second. Losses due to Joule's effect are compiled in an efficiency matrix. It details the percentage of energy which can be transferred from a point to another point in the line.

The objective (1) is to minimize the energy consumption over a given time period, thus to minimize the sum of energy consumptions over every timeslot. If T is conserved the set of timeslots and yt the energy consumption of the line at timeslot t, then the objective function is:

$$\min \sum_{t \in T} y_t \qquad (1)$$

The better use of regenerative energy can prevent the client investing in costly solutions like changing this. The computation of yt can be seen as a formulation of a generalized max flow problem which can be formulated as an LP problem. The minimization of the objective function is done by modifying only dwell times to shift schedules slightly and to synchronize in better way accelerations and braking.

As global energy consumption is optimized by modifying dwell times, the need to clarify what are the relevant dwell time for the formulation arises. The dwell times are computes as follows:

Sets
T: timeslots.
I: metros.
S: stations.
$D^r \subset I \times S$: relevant dwell times.

Parameters
$Dep_{i,s}$: arrival time $t \in T$ of $i \in I$ to the station $s \in S$.
$D_{i,s}$: dwell time of i, $s \in D^r$.
δ: minimal quantity for delaying/speeding up a dwell time.

Variables
$d_{i,s}$: optimized dwell time of metro $i \in I$ at station $s \in S$.
$n_{i,s} \in Z$: number of times δ is applied to a dwell time i,s.

Model $$d_{i,s} = D_{i,s} + n_{i,s}\delta \qquad (2)$$

with $$D^r = \{D \in I \times S / \inf(T) \leq Dep_{i,s} \leq \sup(T)\} \qquad (3)$$

Then these are the dwell times $d_{i,s} \in D^r \subset I \times S$ that the genetic algorithm will modify to minimize the objective function. Note that n can be unbounded. In the model, it is however bounded by small integers to stick on the quality of service issue and to keep having an invisible optimization for the final user.

Modifying dwell times involves a new synchronization between metros. Every iteration of the genetic algorithm can be computed, resulting in an objective function. As explicated in (1), every timeslot represents an independent problem. The issue here is that it is hard to know exactly how regenerated energy will spread throughout third rail and other metros. Some models take as a hypothesis that metros can transfer entirely their regenerative energy to others only if they belong to the same electric sub-section. The hypothesis here is that energy is dissipating proportionally to the distance between two metros. Also, the hypothesis here is that the energy is spread in an optimal way, i.e., the model minimizes the loss of energy. Then, for a given timeslot there is:

Sets $I^+$: metros consuming energy.
$I^-$: metros producing energy.

Parameters $E_i^+$: energy consumed by metro $i \in I^+ (>0)$.
$E_i^-$: energy produced by metro $i \in I^- (<0)$.
$A_{i,j}$: proportion of the energy produced by $i \in I^-$ transferable to $j \in I_+$ due to Joule's effect.

Variables $x_{i,j}$: proportion of the energy produced by $i \in I^-$ transferred to $j \in I^+$.

Model $$\text{minimize } y \quad (4)$$

subject to $$\sum_i^{I^+} E_i^+ + \sum_i^{I^-} \left( E_i^- \cdot \sum_j^{I^+} x_{i,j} \cdot A_{i,j} \right) \leq y \quad (5)$$

$$\sum_j^{I^+} x_{i,j} \leq 1 \ \forall \ i \in I^- \quad (6)$$

$$-\sum_i^{I^-} x_{i,j} E_i^- \cdot A_{i,j} \leq E_j^+ \ \forall \ j \in I^+ \quad (7)$$

$$x_{i,j} \geq 0 \ \forall \ i \in I^-, \forall \ j \in I^+ \quad (8)$$

$$y \geq 0 \quad (9)$$

The LP model minimizes the energy consumed by spreading the energy produced in such a way $-\Sigma_i^I (E_i^-, \Sigma_j^{I^+} x_{i,j}, A_{i,j})$ is maximized. Note that (9) prevents the energy to be less than 0 at a given timeslot. It is because it is considered that the regenerative energy which is not utilized immediately is lost.

By modifying only slightly the dwell times, it is considered that the algorithm never reaches non satisfiability (not satisfied) as it is stayed in tolerable intervals, e.g., for headways. Every individual in the population is represented by a two array table with metros in rows and stations in columns. Each cell represents a dwell time. Starting with initial dwell times, a population is created made of 100 individuals. Then every dwell time is randomized within a predefined domain, e.g., f−3 s, 0 s, +3 s, +6 s, +9 sg. Finally, for every iteration, individuals are classified according to their objective function and selected. A crossover and mutation can be applied to them until convergence.

The model has been tested with a one-hour time horizon, corresponding to 3600 timeslots, 29 metros, and 495 dwell times to optimize. The objective function has a value 8504 a.u. at time t0. After 450 iterations, total energy consumption is only 7939.4 a.u, that to say 6.6% saving. The computation lasts over 88 hours long on an Intel Core 2 1.86 GHz Linux PC. As this optimization is to minimize an off-line timetable, it can be allowed.

A real metro line is subject to minor disturbances that can affect the adherence to the timetable. To check the relevance of the optimization, there can be an added a random noise on optimized dwell times to quantify the robustness of the objective function. This noise consists in randomly modifying dwell times by $\pm \delta$s.

TABLE 1

Alteration of the objective function according to noise

| Noise (s) | 1 | 3 | 6 |
|---|---|---|---|
| Average on 100 tries (u.a.) | 7964.9 | 7995.7 | 8028.4 |
| Saving (%) | 6.3 | 6.0 | 5.6 |

Table 1 shows the results. It can be seen that even with 6 second noise (corresponding to 2 intervals of modification from time of parking/stationary), the objective function is still saving 5.6% energy. This means that the optimized solution is saving energy, but also all its neighbor solutions.

This resolution method to optimize the energy consumption in a metro line seems promising and deserves more research. In particular, it is wanted to increase the number of parameters that can be modified, such as departure times in terminals or speed profiles. Effort can be made to also compare these results with other methods such as constraint programming. Eventually, decreasing computation time can allow this method to be used in a real-time context, in particular when it is about to optimize energy consumption after major incidents.

The following is a description related to a data model for energy optimization.

The following provides a comprehensive overview of the different data needed to formalize a model representing the energy consumption of trains and/or vehicles. It gives also a possible formulation of the model itself regarding the given data as well as different approaches for representing as best, and taking into account time computation, the energy consumption.

Embodiments of the invention can be a software system used to decrease energy consumption in a metro line. This system allows a better synchronization of accelerating and braking metros, optimizing the use of regenerative energy produced by metros when braking.

In an embodiment, the system uses as input the current timetable of a line. Including all possible regulation constraints like headways, the system modifies dwell times, departures times, and possibly speed profiles in a transparent way for the user. Indeed, the system takes into account quality of service by only slightly modifying the different parameters of the trip. To decrease energy consumption, the system has energy data of trains (their energy profile) as well as the topology of the line (how do electric sub stations work) to optimize train patterns. The output of the system, embedded in ATS, is a new version of the timetable, which may look like the old one but which is energy optimized.

The system allows optimizing the use of regenerative energy due to braking metros (vehicles, trains, etc.). Indeed, if the regenerative energy is not consumed immediately by another metro in the line (if there is no other solutions like reversible electric sub stations or super capacitors), then this energy is lost as heat in the third rail. The regenerative energy, even if it does not decrease directly the overall energy consumption, permits to use less energy to start another metro which needs energy at the same time. Then the optimized reuse of regenerative energy indirectly decreases the total energy consumption.

The better use of regenerative energy can prevent the client investing in costly solutions like changing his electric substations into reversible ones or embedding batteries in metros. The software approach as well as the minimal impact on quality of service can be seen by the client as a "free" optimization, because he can save energy just by clicking on a button "optimize", and not by adding new devices on the line.

Conventional techniques provide different solutions to attempt to use the regenerative energy such as, but not limiting to, powering the air conditioning system in metros, charging embedded batteries, powering flywheels for later use, charging embedded super capacitors, supplying reversible electric substations, among others.

Embodiments of the system further include a graphic user interface (GUI) that allows setting parameters of optimization in real time to make a system or metro line more efficient. The GUI can allow selection between optimized or actual timetables when perturbations occur.

This model can be used in to minimize the energy consumption of trains over a period of time by software means. The optimization would indeed be done modifying the dwell times and departures at terminals and/or speed profiles. This optimization solution would be part of the solution of creating timetables and in another time, would be implemented for optimizing energy during real time regulation.

Data

The following is a description of the data utilized by an optimization model. To formulate a model accurate enough to forecast the gain in energy a fine optimization of timetables can perform, one needs the relevant data to do so. These data might be retrieved from a real case or made up internally, knowing the more realistic the data, the more relevant the optimization. The following is an example of data and is not to be limiting on the subject application.

The data can be at least one of the following: feasible timetable (including departures/arrivals of stations/terminals, dwell times, train patterns/trips linking, stabling/unstabling pattern, etc.); energy profiles (depending on charge of train/vehicle, type of rolling stock, speed profile, etc.); electric network topology; electric efficiency of equipment; tolerances (for degrees of freedom, quality of service constraints, feasibility constraints, etc.); and origin/destination matrix.

All data such as energy profiles, timetable scheduled hours and other including a time precision should be standardized. This precision will be chosen regarding different terms: precision of real systems; computing space available; and/or need for good precision for optimization. In an embodiment, the optimization and model can be discretized (e.g., discrete model) and not continuous.

Timetable

The optimization of the energy consumption in a metro line can be done on an already made timetable. The optimization can be a modification of several parameters of an initial timetable which minimizes the energy consumption and not a creation "from scratch" of a timetable considering energy issues. However, several possibilities are open to get this timetable.

The timetable can be fully given, that is to say that it gives the departure times of every trip at every stop. This is typically the timetable given to passengers for information in railroad but not in mass transit, where the timetable is mostly given in terms of periodicity (e.g., every 2 minutes). In addition, the optimization needs the information about stabling/unstabling trains at terminals as well as rolling stock types, speed profiles associated to every trip.

It can be given as well a map of departure times at terminals in addition with running times and dwell times at every station, those giving a full timetable when computed together. The information about stabling/unstabling and rolling stocks is still needed though.

Energy Profile

The energy model cannot be done without knowing exactly what are the energy consumption as well as the regenerative energy of the trains. The energy profile is however dependent to a lot of factors and several profiles—or at least a way to deduce several scenarios from a general profile—are needed.

It is easier to move a train when empty than in peak hours when full of people. That is why one should have different charge-dependent energy profiles. It is also possible to have a charge-dependent rate which would be multiplied to an empty charge energy profile to get trains energy profiles dependent of their charge.

Every type of train have different energy pattern, regarding their engine efficiency and their possible capability to provide regenerative energy, which can be taken into account.

Most of timetabling software takes into account different speed profiles for a train. For instance, one can drive a train at normal, fast or economic speeds. These speed profiles can imply substantially similar amount of energy profiles.

Electric Efficiency

There is a difference between the input energy and the useful energy—i.e., the kinetic energy of the train—because real devices are never 100% efficient.

Every wire, catenary, third rail or any other cable has an internal resistance greater than zero. With this data, the losses over cables are known, which would change the amount of regenerative energy a train is able to supply to another one. For instance, supplying a train at terminal B with the regenerative energy of a train braking in terminal A is not possible regarding the lineic resistance.

In the same spirit, transformers and other electric devices (such as rolling stock) have a particular efficiency which has to be taken into account.

Network Topology

Regarding the topology of the electric network of the metro line, it might not be possible to do several actions. It is important to know, over a particular example, if it is physically possible to, for instance, link directly to electrical points.

The network can possibly be divided into electric sections which may be independent. By doing so, the trains are forced to supply other trains with regenerative energy only if they are in the same section, being unable to supply electricity in other sections if they are isolated.

One has to consider the maximum amount of energy cables and equipment are able to withstand without deterioration. It is particularly important regarding the issues of maximum traction energy: a peak of energy occurring at a given time which can be above a certain limit.

Tolerances

The tolerances are the levers which can be pulled to optimize the energy consumption. It has been chosen that the energy optimization would be done only by modifying the timetable, and not using hardware means such as flywheels or embedded batteries. The tolerances given by the data will most likely be the acceptable intervals where the quality of service is not impacted.

These parameters are the ones the optimization can directly modify to minimize the overall energy consumption.

The stops in every station, normally given in the initial timetable, will be modified for optimizing the timetable. Regarding initial dwell times, one will be able to shorten or lengthen them in a certain amount given by tolerances. To not impact on quality of service, it will be also necessary to take care of a global shift all along a trip. For instance, every dwell time of a 20-station trip can be shortened by 5 seconds but the global shifting cannot be greater than 50 seconds (10 dwell times shortened).

Similarly to dwell times, departure times can be shortened or lengthened depending on the need of the optimization. The main difference is that departure times might be shifted inside bigger intervals as the departure time affects much less the quality of service (nobody is waiting in the train at this moment).

Speed profiles can be adjusted or modified to optimize the timetable (discussed above).

These parameters are the ones the optimization will indirectly modify as they are dependent to ones the optimization can directly modify. These constraints can be unsatisfied during the process of optimization but the final optimized timetable must satisfy all the constraints, or the timetable will be considered unfeasible.

The commercial speed represents the time a train is taking to go from its departure terminal to its arrival. Optimizing timetable should not affect too much this commercial speed. Whereas departure times do not affect it, dwell times do. Indeed, if a train is delayed by 10 seconds at one station but sticks to the timetable at the rest of its trip, then its commercial speed will be lengthened by 10 seconds.

Figure 9:
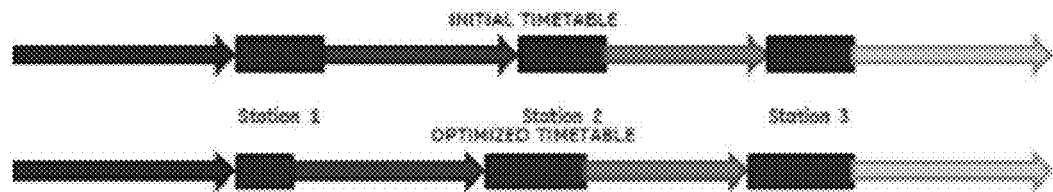
FIG. 9 illustrates an initial timetable and an optimized timetable.

One has thus to take care of the commercial speed of trains, for instance by balancing the delays of trains; if a train is delayed at a station, it may leave earlier another station (see FIG. 9). FIG. 9 illustrates an initial timetable and an optimized timetable, wherein as first dwell time is shortened in the optimized timetable, others have to be lengthened to respect commercial speed.

The distance (or time) between two trains is crucial in terms of security—when the headway is too short—and in terms of quality of service when it gets too long. The headway is obviously directly modified by the modification of dwell times; one has to know the limits of modification of these.

Figure 10:
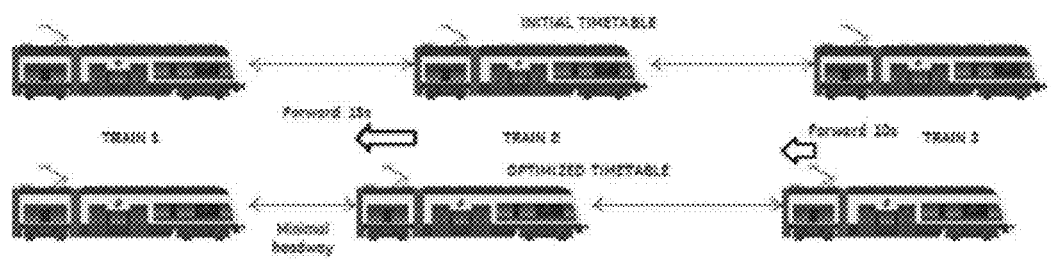
FIG. 10 illustrates a first train timetable and a second train timetable.

Headways imply two kinds of tolerances: local and global. The local tolerance forces the headway to be within an interval centered on the initial headway (e.g., ±10%). The global tolerance acts as a "balance" between different headways. Indeed, to not degrade too much the quality of service, headways have to be not too different from each other to not create gaps between trains as shown in FIG. 10. FIG. 10 illustrates Train 1 and Train 2, wherein Train 2 is delayed to optimize energy consumption and pulls train 3 which is delayed as well. To understand it, one can imagine that every train is linked to others with a spring. If a train is delayed, then it pulls on other springs and other trains are delayed as well.

Different constraints are occurring in terminals which have to be taken into account for testing the feasibility of the timetable. Usually, only a limited amount of trains can take the actions of stabling, unstabling or returning in the same time at a particular terminal.

Origin/Destination Matrix

This three dimension matrix represents the number of people going from a station to another in function of time as shown in Table A. It will be useful in some model refinements to formulate penalties on certain moves for optimization. For instance, a station which is considered as strongly used by passengers will not likely have its dwell time changed compared to another station where few people stop at. The origin/destination matrix can be delivered with an approximation of the amount of people using metro at each station. This refinement is of course to avoid degrading the quality of service.

The matrix may be used in future development for testing the robustness of the optimization, by introducing perturbations within the matrix and verifying that the optimization remains intact.

TABLE A

Origin/Destination matrix for a 10 minutes section of 5 station

| stations | Number Of people | 1 | 2 | 3 | 4 | 5 | |
|---|---|---|---|---|---|---|---|
| 1 | 2145 | 0 | 20 | 36 | 22 | 22 | 100 |
| 2 | 1287 | 10 | 0 | 23 | 30 | 37 | 100 |
| 3 | 564 | 31 | 19 | 0 | 33 | 17 | 100 |
| 4 | 3780 | 40 | 30 | 12 | 0 | 18 | 100 |
| 5 | 1546 | 17 | 37 | 28 | 18 | 0 | 100 |

Model Energy

The following relates to algorithmic approaches to model energy flows in the railway network. Different formulations can be inferred regarding to the topology of the real system one wants to model and to the simplifications one has to make to be able to optimize the model in reasonable time. The following shows several ways to formulate different parts of the energy section of the data model.

Energy Accountings

The way one is counting the energy consumed over a period of time obviously modifies the accuracy of the model. However it might be possible to show that the differences on counting energy influence only the absolute final value and not the relative gain of energy allowed by an optimization. Some simplifications on how to count energy may thus be conceivable if the output of our model is a relative gain of energy compared to the initial solution. The need of refining the model is however essential if the output of the model considers absolute values like the maximum traction energy.

This formulation considers as the energy needed, thus the energy considered in optimization computation, the one which is effectively used to supply electrically the train. This model actually considers that the electric energy provided by electric stations is fully available without any loss anywhere on the network. This model is valid assuming that electric losses through materials and equipment can be considered as constant over a time period and then irrelevant for a relative optimization.

This formulation prefers considering the energy drawn from electric provider needed to supply the train, possibly considering potential losses due to ohmic resistances in the third rail or in catenaries. This energy is logically higher than the energy eventually consumed by the train. This refinement is particularly important if it is considered the maximum traction energy issues.

Network Topologies

This formulation considers that all points of a network (most commonly a single metro line) are electrically linked. This means that a braking train would be able to provide energy to any given train accelerating at any point of the line.

This formulation considers that the network is divided into independent sections which are electrically isolated from each other. This means that a braking train would be able to provide its energy to trains accelerating only if they are in the same area or section.

This simplification considers that a single electric station is providing electric energy on all points of the network. This simplification, associated with the sink oriented energy counter, allows not considering the primary energy transportation which occurs between electric stations and trains accelerating. It permits focusing only on the secondary energy transportation, that is to say the exchange of energy from trains (braking) to electric stations or, depending on the model, directly from braking trains to accelerating trains.

This model considers that trains are electrically supplied by different electric sub-stations, depending position on the network. For instance, one can consider that there is an electric sub-station at every metro station and that trains are drawing energy to the network from the electric sub-station/metro station they belong to at a particular time.

Energy Transportation

This transportation includes the transfer of electric energy between the electricity provider and the train, counting different devices such as cables or transformers which can occur as intermediaries.

This transportation includes the energy provided by regenerative brakes on trains to supply other trains, counting different devices such as cables or transformers which can occur as intermediaries.

Direct exchange is a formulation that considers regenerative energy is directly shared between trains only via wires.

Indirect exchange is a formulation that considers braking trains give back energy to the electricity provider which is able subsequently, to provide this energy to demanding trains. It is also possible to consider that regenerative energy is bought back by the electricity provider instead of being redistributed over the network Ohmic Resistance Loss One can consider the electric transportation through wires, catenaries and third rails as perfect, that is to say that electric energy provided by a device on the network would be usable fully and instantaneously by any other device of the network. It is obvious that for having a more accurate model, one has to consider ohmic resistance losses occurring in all cables. These energy losses can be considered on the primary energy transportation, the second energy transportation or both.

This formulation (geographic losses) allows the most accurate way to model ohmic losses. It is based on keeping track of trains over a grid which exactly represents the network topology. The losses are then simply computed, multiplying the distance between two electrically linked points by an attenuation rate. The main issue is that keeping track of trains geographically implies having an accurate model which includes distances and speeds. This formulation seems to be at first glance too much refined to have a simple and fast optimization program.

This formulation (interstation losses) is a relaxation of the geographic topology. It only keeps track of the interstation (the area between two metro stations) where every metro is. So the losses are computed by checking the distance between two interstations and applying an attenuation rate as shown in Table B. For instance, if two metros are in the same station, the distance is 0, and so on.

TABLE B

Attenuation rate in function of the distance between two interstations

| Interstation Distance | 0 | 1 | 2 | 3 | 4 | 5+ |
|---|---|---|---|---|---|---|
| Attenuation rate | 1 | 0.9 | 0.7 | 0.4 | 0.1 | 0 |

Depending on the network and physical constraints given by experts, it is possible to set different functions of attenuation.

The attenuation decreases linearly along the distance between two points. The gradient would be chosen accordingly with experts.

The attenuation is low on short distances but decreases strongly when distances do so.

Equipment Losses

It is considered here that the different energy transportation devices (cables, catenaries, third rails . . . ) have the same ohmic resistance and thus the energy loss along distance is simply a function of an attenuation rate (e.g., homogeneous equipment).

Catenaries, third rails, etc. have different ohmic resistances and each section/area is associated with equipment, so a particular attenuation function. If during an energy transfer, different equipment is used, then the losses are different along the different sections (e.g., heterogeneous equipment).

A selection can be made between choosing to count or not devices which are intermediaries between two electric points, such as transformers, providers or trains. Every device can have an energetic efficiency that one has to take into account in the computation of the energy consumption (e.g., transfer equipment counting).

Data Shape

Beyond the several possibilities given by all different sorts of data one could get, one model with a particular shape for data has been chosen for a first implementation. It follows the formulation of past work adding some refinements in terms of computing energy. The shape of the important data needed as soon as possible is explicated below.

The precision for the discretized data (e.g., discrete data) is chosen at 5 s. It is then possible to optimize finely without altering quality of service. Moreover, most of state-of-art software works with a granularity of 5 s.

Data Table

The below Table C illustrates data tables regarding an exemplary trip 1 and trip 2.

TABLE C

Shape for data formatting

| T1 ->T2 | | | | T2 ->T1 | | | |
|---|---|---|---|---|---|---|---|
| Trip | 1 | 3 | 5 | Trip | 2 | 4 | 6 |
| Departure Time | 0 | 240 | 500 | Departure Time | 50 | 295 | 550 |
| Dead Run Time | 120 | 120 | 120 | | 135 | 135 | 135 |
| Speed Profile | | | | Speed Profile | | | |
| T1 -> S1 | norm | norm | norm | T2 -> S4 | normal | normal | Eco |
| S1 -> S2 | eco | eco | eco | S4 -> S3 | normal | eco | Eco |
| S2 -> S3 | eco | normal | eco | S3 -> S2 | normal | normal | Eco |
| S3 -> S4 | eco | eco | fast | S2 -> S1 | eco | fast | Fast |
| S4 -> T2 | fast | fast | fast | S1 -> T1 | fast | fast | normal |

TABLE C-continued

Shape for data formatting

| Dwell Time | | | | Dwell Time | | | | | | |
|---|---|---|---|---|---|---|---|---|---|---|
| S1 | 30 | 25 | 35 | S4 | 30 | 25 | | 30 | | |
| S2 | 25 | 25 | 25 | S3 | 30 | 25 | | 25 | | |
| S3 | 30 | 35 | 30 | S2 | 30 | 40 | | 25 | | |
| S4 | 30 | 30 | 25 | S1 | 30 | 30 | | 25 | | |
| T2 | 40 | 40 | 40 | T1 | 40 | 40 | | 40 | | |

Arrivals and departure times of trip 1 can be drawn from the data table above and the energy patterns of each interstation/speed profile.

Trip 1

| Journey | T1D | S1A | S1D | S2A | S2D | S3A | S3D | S4A | S4D | T2A | T2D |
|---|---|---|---|---|---|---|---|---|---|---|---|
| Time | 0 | 120 | 150 | 300 | 325 | 475 | 505 | 655 | 685 | 785 | 825 |

A = Arrival
D = Departure

An interstation, in accordance with a speed profile, will have a specific energy pattern (see Table D). This pattern represents the energy consumed (or generated) by a train within timeslots of 5 seconds. The duration of this pattern (in terms of timeslots) will be used to set the timetable of the trip.

TABLE D

Example of an energy pattern
S1 -> S2 normal

| 5 sec Timeslot | traction (kW.h) | Comments |
|---|---|---|
| — | 0.00 | dwell |
| 1 | 1.39 | traction |
| 2 | 5.56 | |
| 3 | 8.33 | |
| 4 | 4.17 | |
| 5 | 0.69 | coasting |
| 6 | 0.69 | |
| 7 | 0.69 | |
| 8 | 0.69 | |
| 9 | 0.69 | |
| 10 | −4.17 | braking |
| 11 | −2.08 | |
| 12 | −0.69 | |
| — | 0.00 | dwell |

This (dead run times) represents the time needed for a train to operate in terminal. This includes the change of direction and of driver. These figures are important to check that not too many trains are "jamming" in terminals during optimization.

An attenuation matrix can be employed. Even if a metro line consist of several electric sub-stations and sections which supply energy to trains accordingly to their geographical position, consider that sections are interconnected so that regenerative energy from braking can be dispatched all along the line.

This hypothesis implies taking into account Joule effect in third rail. The lineic resistance of the third rail is equal to 7 µΩ/m.

The driving tension for metros is equal to 750V.

The regenerative energy is equal to around 30-40% of the traction energy. The power peak of traction for a single train is equal to 3000 kW and to 2000 kW for the braking phase.

Consider after some computation (see below Annex 1) that the attenuation is equal to 1.65%/km. It means that if a braking train is able to produce 3MJ, it will be however able to supply a train at 5 km far from it with only 2.75MJ.

Every given time, it will be possible to know at which interstation (the line between two stations) a train is, knowing the journey pattern and the time pattern of every train. Then, when a train will brake to supply candidate trains on the line, it will be necessary to compute the attenuation of the energy along the third rail.

To compute the attenuation between two interstations, multiply the attenuation rate by the probable distance between two trains.

For instance, if two trains are in the same interstation, one cannot know exactly where they are and what the distance which separates them is.

That is why a probabilistic value can be used to compute the attenuation which is done as follows: 1) If two trains are in the same interstation, their probable distance is ⅓ of the length of the interstation; and 2) If two trains are in two different interstations, their distance is equal to half of the length of the two interstations they belong to plus the length of the interstations which separate them.

Figure 11:
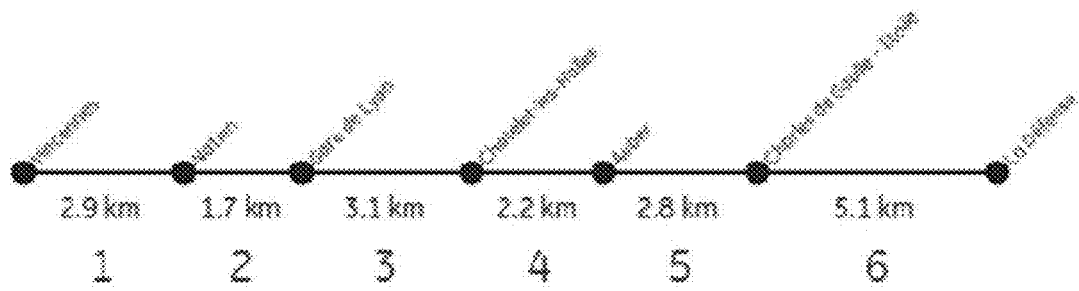
FIG. 11 illustrates an example of interstation lengths for a vehicle.

The example below (FIG. 11 and Table E) shows how an attenuation matrix will look like. FIG. 11 illustrates an example of interstation lengths using the RER A path in Paris. Annex 3 explains how the figures are computed. In the example, if a train is generating energy in interstation 2 (between Nation and Gare de Lyon) to supply a candidate in interstation 5 (between Auber and Charles de Gaulle-Etoile) then the energy supplied will be attenuated by 12.5%.

TABLE E

Attenuation matrix related to FIG.11

| | 1 | 2 | 3 | 4 | 5 | 6 |
|---|---|---|---|---|---|---|
| 1 | 1.65 | 3.8 | 7.76 | 12.1 | 16.3 | 22.7 |
| 2 | 3.8 | 0.99 | 3.96 | 3.22 | 12.5 | 18.9 |
| 3 | 7.76 | 3.96 | 1.65 | 4.37 | 14.9 | 14.9 |
| 4 | 12.1 | 3.22 | 4.37 | 1.16 | 4.13 | 10.6 |
| 5 | 16.3 | 12.5 | 8.5 | 4.13 | 1.49 | 6.44 |
| 6 | 22.7 | 18.9 | 14.9 | 10.6 | 6.44 | 2.81 |

In most cases, power peaks are computed independently for each substation. However, total energy consumption is computed globally. One problem when computing sum of energy consumptions is to compute the attenuation of regenerative energy. Indeed, if you consider in a timeslot one regenerative train and two candidates trains for its energy, you cannot solely subtract the regenerative of the sum, you have to compute the attenuation for giving energy to every candidate and not counting it in the sum of energy consumptions.

Hypothesis 1: Regenerative energy of a braking train is given in priority to the closest candidate and so on until the braking train does not have any more energy remaining or any more trains are candidate.

Hypothesis 2: if several trains generate energy, the one which generates the most supplies in priority.

Hypothesis 3: if no more trains are candidate while some regenerative energy remains, this energy is considered lost and the sum of energy consumptions is equal to 0.

See the algorithm in section below referenced Annex 2 for more details.

Headways are computed between adjacent trains on the line all along their respective trips. It is possible to easily compute headways at every station subtracting arrivals and departures of trains (see Table C) and checking headways are included in authorized intervals.

These authorized intervals are expressed in terms of percentage. For instance, possible headways for an optimization would be in this interval: 0.9×Initial Headway<Authorized Headway<1.1×Initial Headway.

Commercial speed is the time a train takes to cover its whole trip. As well as headways, commercial speed must stay in an authorized interval after optimization. However, it may be considered different tolerances regarding the daytime: tolerances will be looser during off-peak hours for instance.

Data Outputs

The modifications of the timetable are the heart of the energy optimization. They consist in changing, under some constraints, the departure times of trains at every station and the speed profiles of trains at every interstation. The data table will compile all modifications of every trip at every station. The modifications will be directly used to change the energy timetable. The modifications are described by the delay in timeslots (so here in seconds) between the original driving pattern and the optimized one. If a departure is earlier than the original one, the delay will be negative and positive if it is later. Note that dead run times are a priori not modifiable.

Here is an example (Table F) of timetable modifications:

TABLE F

| Timetable modifications example | | | |
|---|---|---|---|
| | T1 -> T2 | | |
| Trip | 1 | 3 | 5 |
| Departure Time | — | 5 | −10 |
| Dead Run Time | — | — | — |
| Speed Profile | | | |
| T1 -> S1 | — | fast | — |
| S1 -> S2 | — | normal | — |
| S2 -> S3 | — | — | — |
| S3 -> S4 | normal | — | normal |
| S4 -> T2 | — | — | — |
| Dwell Time | | | |
| S1 | 5 | — | 10 |
| S2 | −5 | — | 5 |
| S3 | 10 | −5 | 5 |
| S4 | — | −10 | — |
| T2 | — | — | — |

In trip 1, the speed profile for interstation S3→S4 changes from economic to normal when the dwell time at station S3 for trip 3 will be shortened by 5 seconds.

Basically, the energy timetable is a function of the data table (which gives the departure times, the dwell times and the speed profiles), the energy patterns (which fill the energy consumption from the departure timeslot until the end of the pattern) and the timetable modifications (which modifies the pattern).

It compiles also the section where is every train at every timeslot to compute the energy consumption.

Annex 1

Considering a single train can be supplied for traction up to 3MW and power peak in regenerative braking is equal to ⅔ of this amount, so 2MW. Considering nominal voltage of the line is 750V. Considering lineic resistance of third rail is 7 µΩ/m. Considering braking lasts 15 seconds and generates electricity from 2MW to 0 following a linear curve.

$$W_{braking} = \int_0^{15} P_{braking} \cdot dt$$

$$W_{braking} = \int_0^{15} \left(2.10^6 - \frac{2.10^6}{15}t\right) \cdot dt$$

$$W_{braking} = 15 \text{ MJ}$$

Knowing that $$W_{heat} = \int P_{heat} \cdot dt$$

Where $W_{heat}$ is the energy dissipated due to Joule's law and $P_{heat}$ the power dissipated,
That $$P_{heat} = R_{lineic} \cdot D \cdot I^2$$

Where $W_{heat}$ is the energy dissipated due to Joule's law and $P_{heat}$ the power dissipated,
That $$P_{heat} = R_{lineic} \cdot D \cdot I^2$$

Where $R_{lineic}$ is equal to the lineic resistance of the third rail, D the distance between the regenerative train and the candidate and I the intensity
With $$U = R \cdot I$$

Thanks to Ohm law, U being the voltage,
We have $$P_{heat} = D \cdot \frac{U^2}{R_{lineic}}$$

So $$W_{heat} = \frac{D \cdot R_{lineic}}{U^2} \int_0^{15} \left(2.10^6 - \frac{2.10^6}{15}t\right)^2 \cdot dt$$

$$W_{heating} = 24.9 \text{ kJ}$$

With D=1 km.
So the attenuation for 1 km of distance is equal to $$\text{Attenuation} = \frac{W_{heating}}{W_{braking}} = 1.65\%/\text{km}$$

Annex 2
For a given timeslot:
SETS:
Trains (relevant at this given timeslot)
Givers={i, ∀i∈Trains/$E_i$<0} ordered by E descend
Candidates={i, ∀i∈Trains/$E_i$>0}
PARAMETERS:
$P_i$=geographical position of i∈Trains
$En_i$=energy consumed (or generated) by i∈Trains
$M_{i,j}$=rate of attenuation between i∈Trains and j∈Trains
VARIABLES:
X=energy consumption in the timeslot $E_i$=energy consumed effectively by i∈Trains
$D_i$=ohmic resistance distance of i∈Candidates to a given train
for all (i in Trains)
   E(i)=En(i);
for all (i in Givers)
   if(Candidates={ })
     break;
   for all (j in Candidates)
     D(j)=M(P(i),P(j));
   Set CandidatesRelative=Candidates ordered by D ascend;
   while(CandidatesRelative !={ }||E(i)!=0)
     if(E(j)>E(i)*D(j))
       E(j)=E(j)−E(i)*D(j);
       E(i)=0;
     else
       E(i)=E(i)−E(j)*D(j);
       E(j)=0;
       remove j from CandidatesRelative;
       remove j from Candidates;
X=sum(i in Trains)(E(i));
if(X<0)
   X=0;
return X;

The following is description related to energy saving.

The following innovation can reduce energy consumption in metros without adding specific hardware, by taking into account quality of service (QoS), and using existing time tables. The system can reduce energy consumption by avoiding loss of regenerative energy. This may not be applicable when a train does not give back energy or when regenerative energy is saved (e.g., batters, super capacitors, reversible electrical substation, flywheels, in train, or trackside, etc.).

In embodiments, the system can utilize a free optimization. There may be no specific hardware required (e.g., batteries, super capacitors, reversible electrical substation, flywheels, etc.). There can be a reduced cost for optimizing a timetable and there can be an objective of 5% savings.

Figure 5:
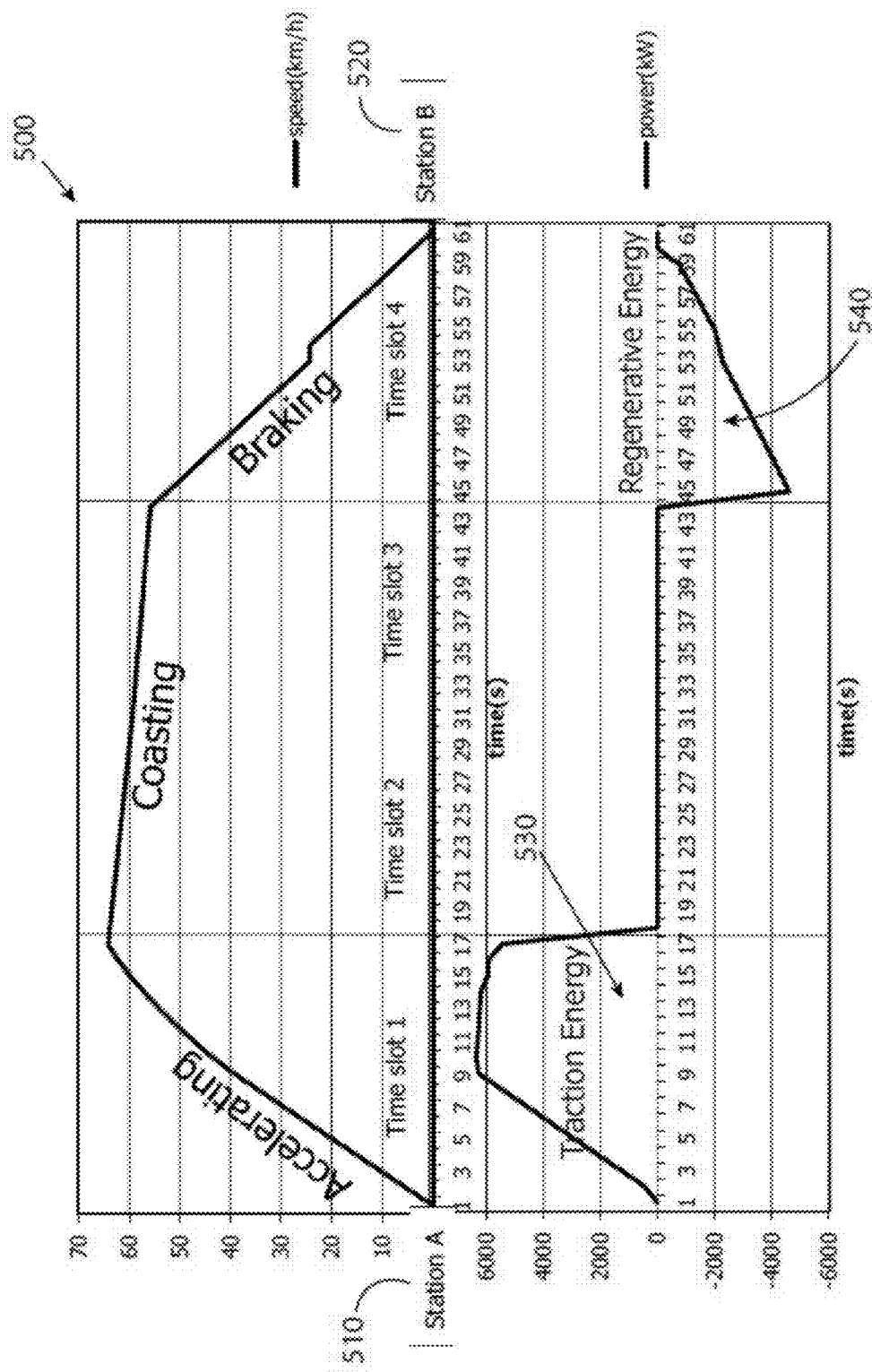
FIG. 5 is an illustration of a graph related to energy consumption of a vehicle.

FIG. 5 illustrates energy consumption of a vehicle (e.g., a metro, a train, among others) on an interstation run in a graph 500. The graph includes a first terminal 510 and a second terminal 520 in which the vehicle can travel therebetween. The graph illustrates a traction energy 530 corresponding to the acceleration of the vehicle from the first terminal. Additionally, the graph illustrates a regenerative energy corresponding to the braking of the vehicle at the second terminal.

Figure 6:
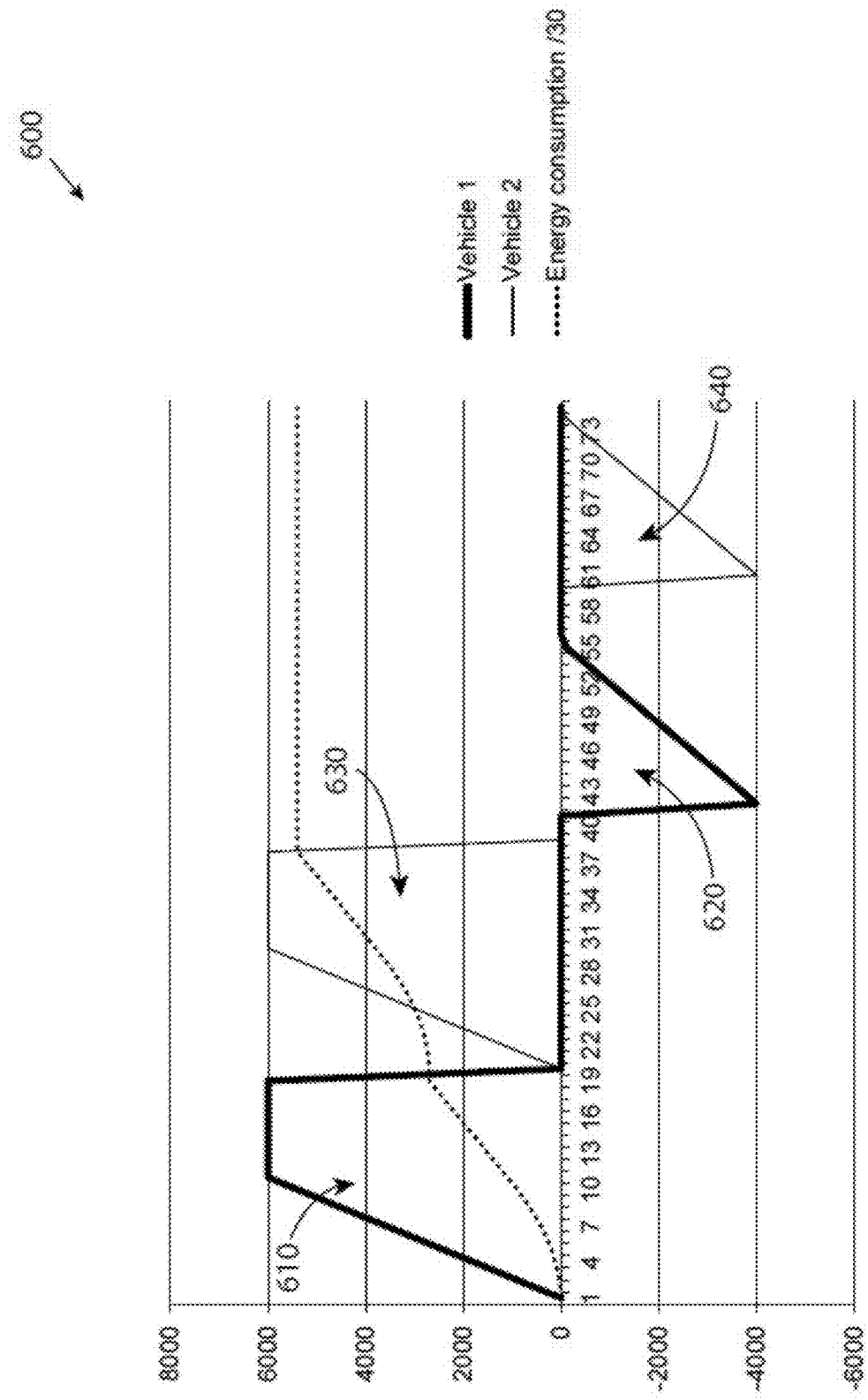
FIG. 6 is an illustration of a graph related to energy consumption of two unsynchronized vehicles.

FIG. 6 illustrates energy consumption of two vehicles (e.g., metros, trains, among others) in a graph 600. The graph illustrates two (2) unsynchronized vehicles (e.g., trains, metros, among others) in which the energy consumption is approximately 162000 kJ (e.g., 45 kWh). The first vehicle (also referred to as train, metro, among others) includes a traction energy 610 upon acceleration and a regenerative energy 620 upon braking. The second vehicle includes a fraction energy 630 associated with accelerating and a regenerative energy 640 associated with braking. The energy consumption is at a high level due to each vehicle adding to the energy consumption.

Figure 7:
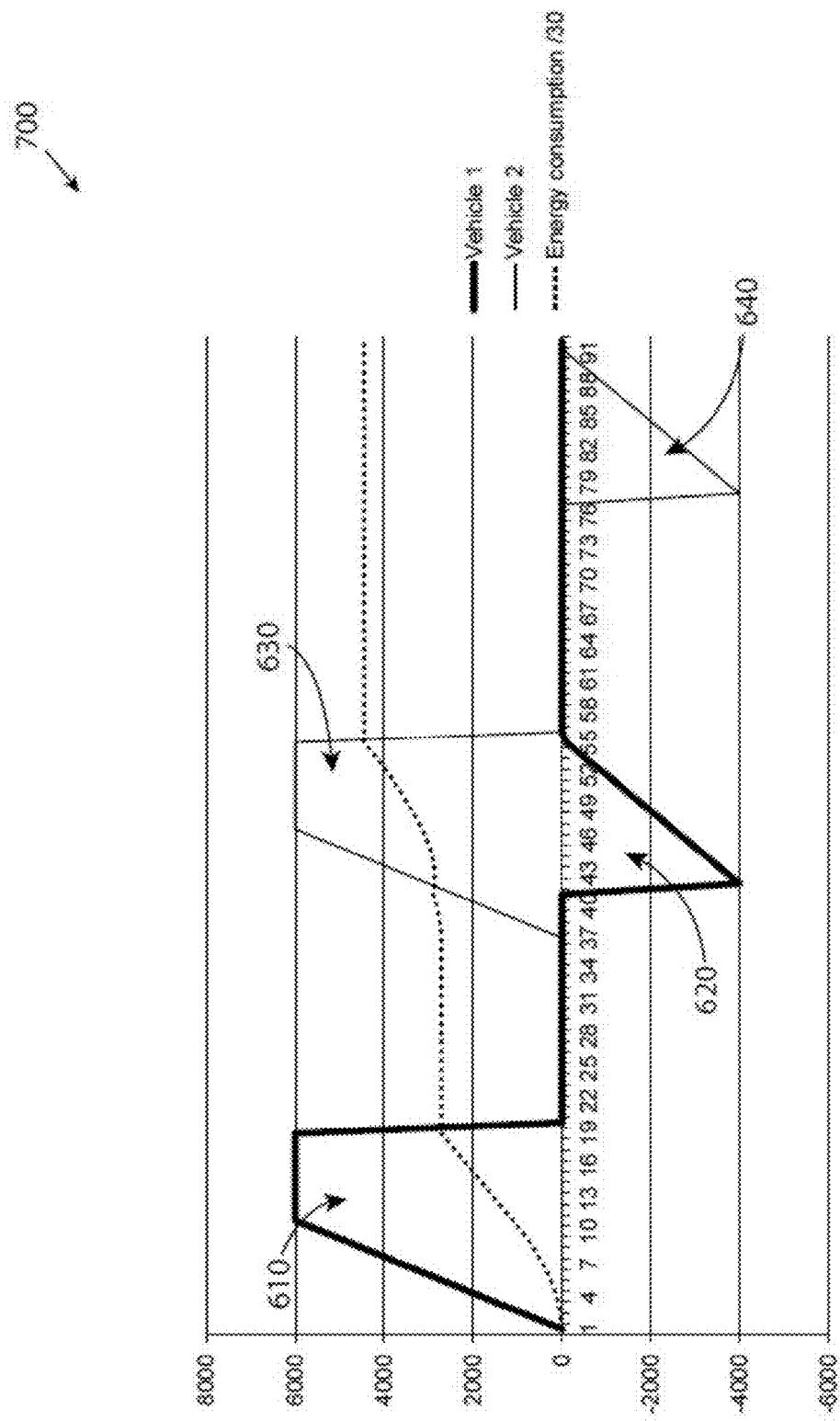
FIG. 7 is an illustration of a graph related to energy consumption of two synchronized vehicles.

FIG. 7 illustrates energy consumption of a vehicle (e.g., a metro, a train, among others) in a graph 700. The graph illustrates two (2) synchronized vehicles in which the energy consumption is 133300 kJ (e.g., 37 kWh) (an amount lower than the amount in FIG. 6 for unsynchronized vehicles). The traction energy 630 of the second vehicle can overlap and correspond to the regenerative energy 620 of the first vehicle, wherein the second vehicle is accelerating and the first vehicle is braking. That there can be a suitable number of vehicles that allow overlap of an acceleration and braking and two vehicles is used as an example.

For instance, there can be more than 10,000 interstation runs in a single operational day. Moreover, it is a combinatory problem on how to synchronize and how much can be saved.

There are quality of service (QoS) constraints. Passenger QoS in urban transit systems can be determined by 2 factors: 1) average wait time for passengers in platform at a terminal (e.g., headway adherence); and 2) travel time (e.g., commercial speed).

Energy optimization of timetable shall minimize the deviation of planned QoS (e.g., keeping the deviation under a threshold defined by the metro operator). The operator may accept more QoS deviations in off peak hours. Moreover, there are more energy losses in off peak hours (e.g., fewer train candidates).

There are different modifications possible to implement. For instance, terminal departure times, dwell times, and speed profiles can be modified.

Terminal departure times can be modified and may impact headways (e.g., not commercial speed). An optimized timetable can be loaded in most of "classical" automatic train stop (ATS) systems.

Dwell times can be modified and can be changed by few seconds each time. The dwell times can be shortened or lengthened and may impact headways and/or commercial speed.

Speed profiles can be modified. For instance, ATC and/or Automatic Train Operation (ATC/ATO) generally allow different speed profiles. For instance, different speed profiles can include normal speed, accelerated speed, and economy (eco) mode. The modification of speed profiles may impact headways and/or commercial speed.

Additional constrains can be headways, rolling stock availability, track availability, and QoS. Headways allowed by ATC/ATP can be hard constraints. ATP may never authorize a train to go under minimum headway. Rolling stock availability can also be hard constraints. There shall be available train for a train departure (typically a train cannot depart before arriving). Track availability can be a hard constraint. A terminal cannot contain more trains than platforms. QoS can be a soft (e.g., flexible) restraint.

There can be energy attenuation due to Joule's effect. Part of regeneration energy can be lost in a $3^{rd}$ rail. Only a 'neighbor' train can absorb energy. The subject innovation provides an accurate model for optimization and a model for the electric topology of the network.

There can be local search methods that use an initial timetable. There may be no need of the global optimum. Minimizing modifications include two methods that have been tested 1) Tabu search (meta heuristics) and 2) genetic algorithms.

Tabu search includes the following: start from one initial timetable, make a modification that minimizes objective, avoid making this modification for some iterations, and go back to making a modification that minimizes objective until termination criterion.

Genetic algorithms (GAs) include the following: instantiate a population of timetables slightly different from the initial one, classify the timetables, mate them (e.g., crossover), mutate them, and go back to instantiating a population of timetables until termination criterion.

The Tabu method can be tested on terminal departure time. There can be a modification of {−30,0,+30} of any departure time in an off line timetable with a timeslot of 15 s. The results show a 3% savings (using as example data of a Korean Metro line). The test can be limited based upon no model of energy attenuation and/or no verification of RSM/track availability.

The GA method can be tested on dwell time modification. The dwell times can be changed by {−3 s, 0 s, 3 s, 6 s, 9 s} in an off line timetable with time horizon of 1 hour (from 10 am to 11 am). With the use of GAs this provides a computation time of 45 minutes.

The sample metro results provide the following: Initial consumption: 14360 kWh; After optimization: 13560 kWh; and Savings: 800 kWh/5.6%. The test can be limited based upon the data is test data and nonexistent.

In another example, there can be an offline/online optimization. The offline optimization can be with GA in which robustness is provided with many constraints and variables. In an online optimization, Tabu method can be used for rapidity, adaptability, need to take into account others online classical regulation objectives (e.g., headway, regulation, passenger platform de-synchro, correspondence, safe haven, etc.). The online optimization can include criteria to trigger the optimization. Moreover, the response time can be taken into account.

The following relates to problem description and complexity. Without regarding different benchmarks or models, one can classify the different problems occurring in the field of energy optimization in metro lines. Indeed many combinatorial problems, like the knapsack or the bin packing ones, accept different variants where variables, parameters or constraints differ. A hierarchy can be formulated between different variants by showing that some problems are sub problems or particular cases of others. One can try to do the same here, to order the different models and problems in the field. There are three points on how energy optimization problems differ from each other:

The objective function. The physical quantity can take several forms. When [1] and [7] are minimizing power peaks (PP) i.e. $\max_{t \in T} y_t$, this model minimizes the global energy consumption of the line (G), i.e. $\Sigma_{t \in T} y_t$ $$d_{i,j} = D_{i,s} + \eta \cdot \delta \quad [1]$$

The variables. Different quantities can be modified to optimize any given objective function. One can consider three different variables that can be modified in a timetable:
  The departure times (D), or the timeslot when a particular trip is starting from its first station. This is what can be modified in [7] or [8].
  The dwell times (d), or the time lasted for a train in every station.
  The speed profiles (s). It is common to have several profiles for a train to cross two stations; typically a nominal one, a full speed and an economic one. Changing speed profiles allows to modify the timetable as well as the energy curve.

One can combine different variables to optimize the objective function. [1] changes speed profiles and dwell times by using reserve time of each trip.

The energy spreading. One can add some subtleties to the model to stick more to real situations. In particular, the way the energy is spread throughout the third rail is primary:
  The simplest model allows regenerative energy to be totally spread in all the metro line (wJ for "without Joule's effect"), like in [7].
  In the other way, the attenuation of regenerative energy when it passes in third rail can be formalized (J) like in our model, by for instance having an attenuation matrix compiling losses between different points of interest of the line. Note that the model wJ can be done by having a trivial attenuation matrix.
  Also, electric sub stations can be (nC), or not, coupled (C). It means that sometimes, it may not be possible to send regenerative energy from a point of the line to another due to the independence of two sub networks in the electric system. This independence can also be done via an attenuation matrix by attenuating completely points which are not belonging to the same electric sub station.

Using this classification, one can classify [7] in (PP, D, C-nJ), [1] in (PP, d-s, C-nJ), [6] in (PP, D, nC-nJ) and our model in (G, d, C-J).

The following relates to computational complexity. It is well-known that optimizing a timetable can be a highly combinatorial problem. Here, it is shown that the dwell times energy minimization problem is NP-hard, by showing that SAT can be polynomially reduced to a particular class of instances of the dwell time energy saving decision problem. Let $X_1, \ldots, X_n$ be variables and $\phi$ a Boolean formula in conjunctive normal form:

$$\phi \Leftrightarrow \bigwedge_{i=1}^{m} \bigvee_{j} l_{i,j}$$

where every is a literal of the form $X_k$ or $\neg X_k$ for $1 \le k \le n$. For every $1 \le k \le n$ and $1 \le i \le m$, one can pose $$u_{k,i} = \begin{cases} -1 & \text{if } X_k \in \{l_{i,j}\}_j, \\ 1 & \text{if } \neg X_k \in \{l_{i,j}\}_j \text{ and} \\ 2 & \text{if otherwise} \end{cases}$$

Let T be the sample of a timetable and S the set of stations. Let I be the set of trains consisting of 1 train $t_0$ and n other trains. All trains stop at stations different from each other during the time horizon. Thus there are $m \cdot (n+1)$ stations in the metro line. The time can be discredited different moments that can be:
  a dwell time, $d_{k,i}$
  an acceleration $a_{k,i}$
  a braking $b_{k,i}$
  a coasting time $c_{k,i}$.

Let a journey trip for a single train be a periodic succession of dwell times, accelerations, coasting times and braking.

For $t_0$ and $\forall i \in S$, the interstation time is equal to 8 and the journey pattern is a periodic succession of:
  a braking phase $b_{0,i}=1$
  a dwell time $d_{0,i}=5$
  an acceleration phase $a_{0,i}=1$
  a coasting phase $c_{0,i}=1$.

By construction, it is suggested that the three first timeslots are the end of the coasting phase of a previous interstation, this means that $t_0$ has its braking phase for every timeslot t such as $t = 8 \cdot i - 4$ with $1 \le i \le m$.

The other n trains have a journey length equal to $8m-1$. So $\forall k \in \{I \setminus t_o\}$ there is a succession of m period of:
  $b_{k,i_k}=1$ and $b_{k,0}=0$
  $d_{k,i_k}=3+u_{k,i_k}$ and $d_{k,1}=3+u_{k,i_k}+\delta_k$ with $\delta_k \in \{-1,1\}$
  $a_{k,i_k}=1$
  $c_{k,i_k}=3-u_{k,i_k}$.

The aim of the optimization is to synchronize accelerations of the n trains with the braking of $t_o$. The timetable is synchronized if and only if trains which accelerate can be optimally synchronized with braking of $t_o$.

Lemma 1. For every timetable T' derived from T with δ', there exist k≥1 and a time t such that $T'_{k,t}=-T'_{0,t}=+$ and a station i such that t=8·i−4, and there exists a j such that $l_{i,j}=X_{k'}$ or $l_{i,j}=\neg X_{k'}$ and $δ'_{k',1}=-1$ if $l_{i,j}=\neg X_{k'}$ and $δ'_{k',1}=1$ if $l_{i,j}=X_{k'}$.

Proof. For every 1≤i≤m, let t=8·i−5. Then $T_{0,t}=-$. For every k'≥1, if there exists a j such that $l_{i,j}=X_{k'}$, then $u_{k',i}=-1$ and $T_{k',t-1}=+$, therefore if $δ'_{k',1}=1$ then $T'_{k',t}=+$. Similarly, if here exists a j such that $l_{i,j}=\neg X_{k'}$, then $u_{k',i}=1$ and $T'_{k',t+1}=+$, therefore if $δ'_{k',1}=-1$ then $T'_{k',t}=+$.

Conversely, if there exist k, k' and a time t such that $T'_{k,t}=-$ and $T'_{k',t}=+$. Note that there is $T_{0,t}=+$ only if t=8·i+2, there is, for k≥1, $T_{k,t}=+$ only if t=8·i−5+$u_{k,i}$, with −1<$u_{k,i}$<2, and there is, for k≥1, $T_{k,t}=-$ only if t=8·i−1. Therefore, k=0 and k'≥1 and there exists an i such that t=8·i−5. Since $T'_{k',t}=+$, there is either $δ'_{k',1}=-1$ or $δ'_{k',1}=1$. If $δ'_{k',1}=-1$, then $u_{k',i}=1$ and there exists j such that $l_{i,j}=\neg X_{k'}$. Similarly, if $δ'_{k',1}=1$, then $u_{k',i}=-1$ and there exists j such that $l_{i,j}=X_{k'}$.

Theorem 1. The network can save m, energy units if and only if φ is satisfiable.

Proof. If φ is satisfiable, there exists a valuation v such that v(φ)⇔1. Consider the timetable T' derived from T with for every 1≤k≤n, $δ'_{k',1}=1$ if $v(X_k)=1$ and $δ'_{k',1}=-1$ if $v(X_k)=0$. For every clause 1≤i≤m, since v(φ)⇔1, there exists a j such that $v(l_{i,j})=1$: that is to say, either $δ'_{k',1}=-1$ if $l_{i,j}=\neg X_k$ or $δ'_{k',1}=1$ if $l_{i,j}=X_k$. Therefore, according to lemma 1, for t=8·i−5, there is $T'_{0,t}=-$ and $T'_{k,t}=+$. So it is possible to save one energy unit at time t=8·i−5 for every 1≤i≤m.

Conversely, if there is a timetable T' derived from T with δ' which saves m energy unit, therefore according to lemma 1, these saves occur at times t=8·i−5 for 1≤i≤m. Consider the valuation v such that for every 1≤k≤n, $v(X_k)=1$ if $δ'_{k,1}=1$, $v(X_k)=0$ otherwise. For every clause 1≤i≤m, there is a save at time t=8·i−5. Therefore, according to lemma 1, there exist k and j such that either $l_{i,j}=X_k$ or $l_{i,j}=\neg X_k$ and either $δ'_{k',1}=-1$ if $l_{i,j}=\neg X_k$ or $δ'_{k',1}=1$ if $l_{i,j}=X_k$. That is to say $v(l_{i,j})=1$.

Example 1

Let φ⇔(x∨y∨¬z)∧(x∨¬y∨z)∧(¬x∨y), the constructed timetable T is as follows, with t for travel at coasting speed, − for braking, +

| $t_o$ | t | t | t | − | d | d | d | d | + | t | − | d | d | d | d | + | t | − | d | d | d | d | + | t |
|---|---|---|---|---|---|---|---|---|---|---|---|---|---|---|---|---|---|---|---|---|---|---|---|---|
| x | d | d | + | t | t | t | t | − | d | d | + | t | t | t | t | − | d | d | d | + | t | t | | |
| y | d | d | + | t | t | t | t | − | d | d | d | + | t | t | − | d | d | + | t | t | t | t | | | |
| z | d | d | d | + | t | t | − | d | d | + | t | t | t | t | − | d | d | d | d | + | t | | | | | for accelerating and d for dwell time.

The following relates to fitness function. The fitness function of the genetic algorithm is copied on the objective function of the model. Different methods are presented below to resolve it, as the computation of it is not trivial. Even if it can be modeled as a generalized max flow problem in a lossy network, whose some resolution algorithms run in polynomial time (in around $O(n^4)$ though), it can also be resolved by a pure LP problem, and by a heuristic whose deviation to the real values is really small.

The following relates to generatlized max flow problems in a lossy network. The notion of max flow has been introduced by Ford-Fulkerson in 1962 in [4] and has been a major research field in the 80's to find polynomial time algorithms. The max flow problem is the problem of maximizing a flow in a flow network.

A flow network is a finite directed graph G(V, E) consisting of edges (u, v) ∈E with a capacity c(u, v) and a flow f(u, v)≤c(u, v) and at least two vertices ∈ V, the source s which can produce flow and the sink t which can absorb flow.

In the generalized maximum flow problem, edges are given in addition with a positive gain function γ(u, v) and an excess function $e_f$ such as:

$$e_f(i) = \sum_{v\in V|(v,u)\in E} \gamma(v,u)f(v,u) + \sum_{v\in V|(v,u)\in E} f(u,v) \quad [5]$$

which means that if a flow f(u, v) is entering at vertex v then γ(u, v) f(u, v) is going out from v.

Identically to regular maximum flow problems, a flow conservation constraint exists here and ensures that:

$$e_f(i)=0, \forall i \in V\setminus\{s,t\}. \quad [6]$$

Then the generalized max flow problem is to find a generalized flow f maximizing the excess function at sink $e_f(t)$.

The generalized max flow model allows for formulating the computation of the objective function as a particular case of it.

Consider an oriented graph G(V, E) with vertices as follows:
a source s
vertices corresponding to trains that produce energy ($I^-$)
vertices corresponding to trains that consume energy ($I^+$)
a sink t.

Edges consist in the virtual links between trains and energy. Then, there are three types of edges:

The edges starting from the source which represents the virtual energy which is given to trains that produce energy. The source virtually gives in the graph energy to trains ∈$I^-$ with an efficiency of 1.

$$(s,i)\in E \Leftrightarrow i\in I^- \quad [7]$$

$$c(s,i)=E_i^-, \gamma(s,i)=1 \quad [8]$$

The edges virtually linking trains that produce energy to those which consume it. Indeed, producers are potentially able to distribute their energy to any consumer, even several consumers. The difference in the distribution is the efficiency along the edge representing the Joule's effect losses directly proportional to the distance between trains.

$$(i,j)\in E \Leftrightarrow i\in I^-, j\in I^+ \quad (9)$$

$$c(i,j)=E_i^-, \gamma(i,j)=A_{i,j} \quad (10)$$

The edges going from consumers to the sink represent the energy that has effectively been saved during the transfer of regenerative energy. The capacity of these edges ensures that a consumer cannot get more energy than it can absorb.

$$(i,t)\in E \Leftrightarrow i\in I^+ \quad (11)$$

$$c(i,j)=E_i^+, \gamma(i,j)=1 \quad (12)$$

For example, a zero flow can correspond to an absence of regenerative energy transfer. By augmenting flow along paths between source and sink, more and more energy is saved until saturation of the graph. As the energy consumption of a timeslot is equal to the energy consumed by accelerating trains minus the amount of regenerative energy they absorb, the corresponding objective function in the generalized max flow representation is:

$$obj = \sum_{i}^{t^+} (c(i, t) - f(i, t)) \quad (13)$$

with the capacities of edges representing the energy consumption of accelerating trains and the flow the regenerative energy they absorbed.

As the gains along edges are all less than equal to 1 ($A_{i,j}$ are attenuation factors, so all are ≤1), the formulation is a lossy network. A lossy network is a generalized network where a flow can decrease as it goes through edges. Onaga proved in [9] two theorems for the generalized max flow problem in a lossy network as follows:

Theorem 2. A given flow is optimal if and only if the residual network does not contain any flow-generating cycle from which the sink t is reachable.

Note that a flow can be optimal even if this is not the maximum flow. A given flow is optimal if the way it is spread in the network minimizes losses along the edges.

Theorem 3. If a flow is optimal then augmenting it on the highest-gain path in the residual network does not create any flow-generating cycle.

Note that the highest-gain path is the path P from s to t such $\Pi_{(i,j)\in P}\gamma(i,j)$ is maximized.

The residual network [10] represents the possibility on every edges of pushing back flows. If there is the set of reverse edges $\overleftarrow{E} = \{(j, i)/(i, j) \in V\}$ and for every edge the gain function $\gamma(j, i) = 1/\gamma(i, j)$. If a residual graph $G_r(V, E_r)$ is associated with $E_r = \{(i, j) \in E | f(i, j) < c(i, j)\} \cup \{(j, i) \in \overleftarrow{E} | c(i, j) > 0\}$, residual capacity functions are as follows:

$$c_r(i, j) = \begin{cases} c(i, j) - f(i, j) & (i, j) \in E, \\ \gamma(i, j) f(j, i) & (i, j) \in \overleftarrow{E}. \end{cases} \quad [14]$$

Figure 12:
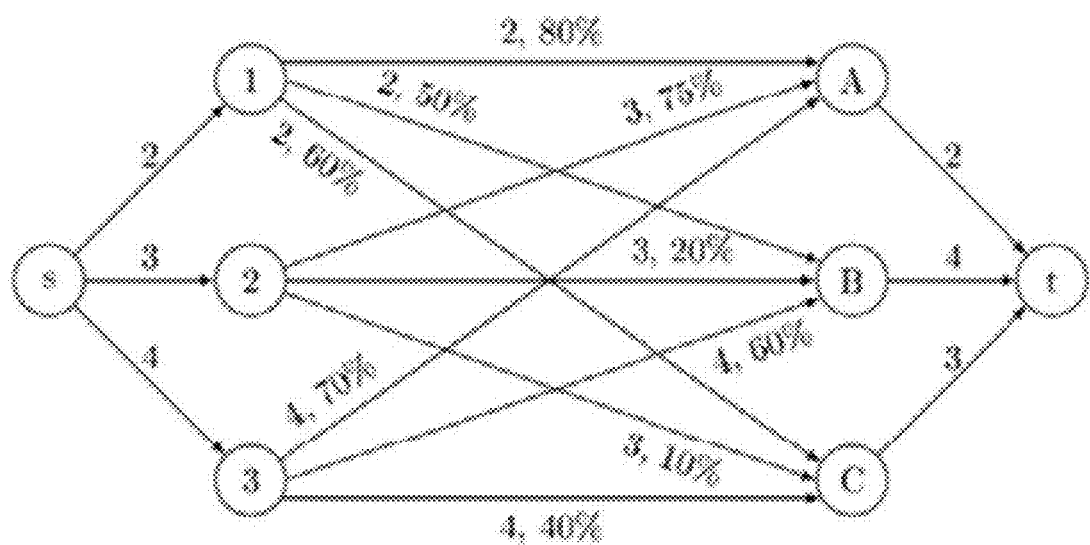
FIG. 12 illustrates an example of a flow determination.

Finding the optimal max flow in a generalized network is then equivalent to saturate the residual generalized network along highest-gain path. Consider the following example (see FIG. 12) consisting of 3 trains 1, 2 and 3 producing respectively 2, 3 and 4 units of energy and 3 trains A, B and C consuming respectively 2, 4 and 3 units of energy: with along edges the capacity and the gain for those different from 1.

Starting with a flow of 0, it is optimal and the residual network is equal to the generalized network. Augmenting flow along highest-gain paths will allow to get optimal max flow when there is no more augmenting path. State of art algorithms now run in $O(E^2(E+V \log(V \log B)) \log B)$ with B the largest integer in the representations of capacities and gains [10].

The heuristic consists in the idea of transferring the energy of each producer to respective closest consumers in the line. By doing that, the transfer of energy is optimal if producers are all independent from each other. Indeed, the choice of which producer will transfer its energy first is randomized so global optimum can be not reached.

The algorithm works as follows:
1: while list_of_producers≠0 do
2: Choose one producer.
3: while producer energy>0 do
4: if list_of_consumers=0 then
5: finish
6: Choose closest consumer.
7: if producer has more energy to transfer than consumer needs then
8: Transfer this amount and remove consumer off the list.
9: else
10: Transfer totality of remaining producer energy to the consumer.
11: Remove producer off the list.
12: finish On a sample of 10000 timeslots, the computation of the real max flow problem compared to the heuristic shows that in 83% of cases, the heuristic gives the same results. In average, the results differ of 3‰. One can use this heuristic for the intermediate computation of the max flow problems as it does not modify enough objective functions to change, for example, the ranking of two different solutions.

The following relates to computation time on real data. Our model has been tested with a one-hour time horizon, corresponding to 3600 timeslots, 30 metros and 496 dwell times to optimize. The objective function has a value 8544.4 a.u. at time $t_o$. After 450 iterations, total energy consumption is about 7884.5 a.u, that to say 7.7% saving.

However, a real metro line is subject to minor perturbations that can affect the adherence to the timetable. To check the relevance of the optimization, a random noise has been added on optimized dwell times to quantify the robustness of the objective function. This noise consists in randomly modifying dwell times by ±δs.

TABLE H

| Noise (s) | 1 | 3 | 6 |
|---|---|---|---|
| Average on 100 tries (u.a.) | 7917.6 | 7984.4 | 8029.7 |
| Saving (%) | 7.3 | 6.6 | 6.0 |

Table H shows the results. There is even with 6 second noise. The optimization is still saving 6.0% energy. This means that the optimized solution is saving energy, but also all its neighbour solutions.

The following relates to computation times on the departure time benchmark. It has been shown before that the problem can be classified as a (G, d, C-J) whereas the problem depicted in [7] is classified as (PP, D, C-nJ). Actually the data model as well as its implementation allows computation of the latter formulation. Slight modifications are done to the data model to compute this problem. In these modifications, it is possible to show the change of the objective function (3) into:

$$\min \max_{t \in T} y_t \quad [21]$$

Indeed, the objective in [7] is to minimize the energy peak, i.e. minimize the energy consumption of the timeslot of the time period where the energy consumption is maximum.

Additionally, regenerative energy is not considered in implementation even if the data model was taking it into account. There is then no need to use any attenuation matrix compiling Joule's effect as no energy transfer is possible. In [6] though, regenerative energy can be transferred in totality to an train consuming energy as long as the two trains are physically in the same electric sub station network. In this model, electric sub stations are not coupled and it is impossible to transfer energy from a point in the line belonging to an electric sub station to a point belonging to another one. The implementation can model that introducing in the attenuation matrix this topology as follows:

$$A_{i,j} = \begin{cases} 1 & \text{if } i \text{ and } j \text{ belong to the some electric sub station,} \\ 0 & \text{otherwise.} \end{cases} \quad [22]$$

These modifications allow to compute the initial objective function value based on the data given in [7]. However, the searching method using a genetic algorithm fails in optimizing this value. It is understandable in the fact that the genetic algorithm modifies globally the different parameters when an efficient heuristic can choose to modify variables which impact the timeslot where the energy peak is. Some techniques give a heuristic searching expressly to energy peaks and trying to smooth such peaks.

The aforementioned systems, components, architectures, environments (e.g., corner protection member, side protection member, protection system, etc.), and the like have been described with respect to interaction between several components and/or elements. Such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein for the sake of brevity, but known by those of skill in the art.

Figure 8:
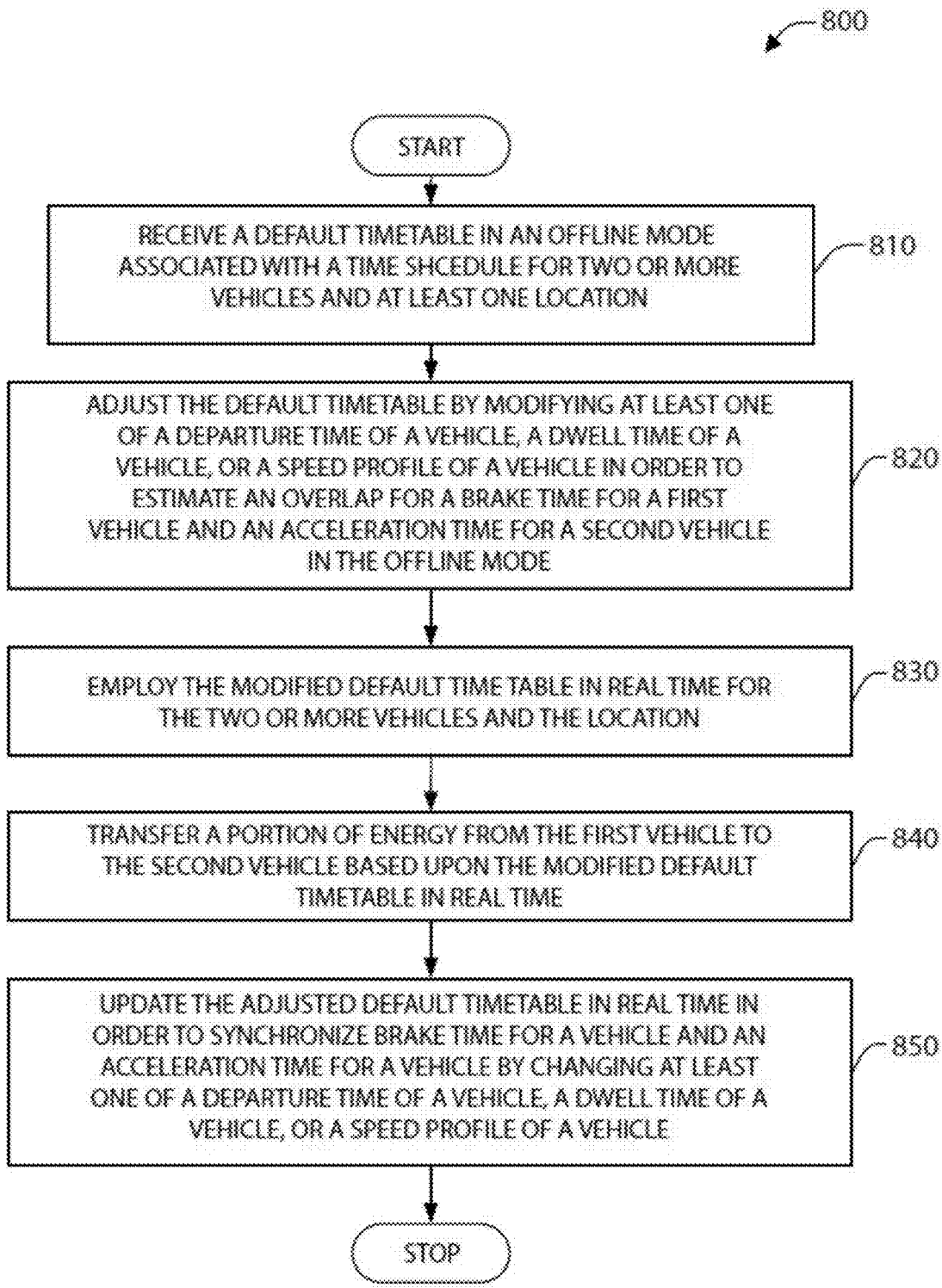
FIG. 8 illustrates a flow chart of an embodiment of a method for modifying a timetable to synchronize a first vehicle and a second vehicle.

In view of the exemplary devices and elements described supra, methodologies that may be implemented in accordance with the disclosed subject matter will be better appreciated with reference to the flow chart of FIG. 8. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow chart of an exemplary embodiment of a method 500. At reference numeral 810, a default timetable can be received in an offline mode, wherein the default timetable can be associated with a time schedule for two or more vehicles and at least one location. At reference numeral 820, the default timetable can be adjusted by modifying at least one of a departure time of a vehicle, a dwell time of a vehicle, or a speed profile of a vehicle to estimate an overlap for a brake time for a first vehicle and an acceleration time for a second vehicle in the offline mode. At reference numeral 830, the modified default timetable can be employed in real time for the two or more vehicles and the location. At reference numeral 840, a portion of energy can be transferred from the first vehicle to the second vehicle based upon the modified default timetable in real time. At reference numeral 850, the adjusted default timetable can be updated in real time to synchronize a brake time for a vehicle and an acceleration time for a vehicle by changing at least of a departure time of a vehicle, a dwell time of a vehicle, or a speed profile of a vehicle.

The method can further include controlling the first vehicle or the second vehicle with a control signal based on the modified default timetable in real time. The method can further include tracking the vehicles in comparison with at least one of the modified timetable or a measured amount of energy, monitoring a threshold value related to the measured amount of energy, and updating the modified timetable based upon the threshold value or the tracking of the vehicles.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

What is claimed is:

1. A system, comprising:
    a first component configured to receive a timetable associated with two or more vehicles and at least one terminal; and
    a second component configured to modify a parameter associated with at least one of a first vehicle or a second vehicle of the two or more vehicles to create a modified timetable that synchronizes and overlaps a brake time for the first vehicle and an acceleration time for the second vehicle.

2. The system of claim 1, wherein the parameter is at least one of a departure time of the first vehicle or the second vehicle, a dwell time of the first vehicle or the second vehicle, or a speed profile of the first vehicle or the second vehicle.

3. The system of claim 1, wherein the second vehicle is configured to transfer a portion of energy from the first vehicle based upon at least one of the modified timetable and the brake time overlapping with the acceleration time.

4. The system of claim 1, wherein the second component is configured to modify the parameter associated with at least one of the first vehicle or the second vehicle to create the modified timetable that overlaps a brake time for the second vehicle and an acceleration time for the first vehicle.

5. The system of claim 4, where the first vehicle is configured to transfer a portion of energy from the second vehicle based upon at least one of the modified timetable and the brake time for the second vehicle overlapping with the acceleration time for the first vehicle.

6. The system of claim 1, further comprising:
a third component configured to aggregate a static input related to at least one of the two or more vehicles, the terminal, an energy model, or a quality of service constraint; and
the second component further configured to create the modified timetable that overlaps the brake time for the first vehicle and the acceleration time of the second vehicle based on the static input.

7. The system of claim 1, further comprising:
a fourth component configured to aggregate a dynamic input related to at least one of the two or more vehicles, the terminal, an in-use dwell time for the first vehicle or the second vehicle, an in-use departure time for the first vehicle or the second vehicle, or an in-use speed profile for the first vehicle or the second vehicle; and
the second component further configured to create the modified timetable that overlaps the brake time for the first vehicle and the acceleration time of the second vehicle based on the static input.

8. The system of claim 1, further comprising:
a fifth component configured to create at least one energy model to represent a portion of energy used by at least one of the terminal, the first vehicle, or the second vehicle; and
the second component further configured to create the modified timetable that overlaps the brake time for the first vehicle and the acceleration time of the second vehicle based on the at least one energy model.

9. The system of claim 8, wherein the at least one energy model relates to at least one of a network topology for the terminal, an energy transportation between at least two of the first vehicle, the second vehicle, and a track for the first vehicle or the second vehicle, an ohmic resistance loss, or an equipment loss.

10. The system of claim 1, further comprising a controller that is configured to generate and communicate a control signal to the first vehicle or the second vehicle based on the modified timetable, wherein the control signal is used with an automated control of the first vehicle or the second vehicle or a manual control of the first vehicle or the second vehicle.

11. The system of claim 10, further comprising a sixth component that is configured to implement a buffer time to compensate for a human reaction time delay related to implementing the control signal for the first vehicle or the second vehicle.

12. The system of claim 1, wherein the second component is configured to create the modified timetable in an offline environment that corresponds to data representative of the terminal.

13. The system of claim 12, wherein the second component is configured to employ the modified timetable created in the offline environment within an online environment of the terminal.

14. A method, comprising:
receiving a default timetable in an offline mode associated with a time schedule for two or more vehicles and at least one location;
adjusting the default timetable by modifying at least one of a departure time associated with the two or more vehicles, a dwell time associated with the two or more vehicles, or a speed profile associated with the two or more vehicles to estimate an overlap for a brake time for a first vehicle of the two or more vehicles and an acceleration time for a second vehicle of the two or more vehicles in the offline mode;
employing the adjusted default timetable in real time for the two or more vehicles and the location;
transferring a portion of energy from the first vehicle to the second vehicle based upon the adjusted default timetable in real time; and
updating the adjusted default timetable in real time to synchronize the overlap for the brake time for the first vehicle and the acceleration time for the second vehicle.

15. The method of claim 14, further comprising controlling the first vehicle or the second vehicle with a control signal based on the adjusted default timetable in real time.

16. The method of claim 15, further comprising:
tracking the two or more vehicles in comparison with at least one of the adjusted timetable or a measured amount of energy;
monitoring a threshold value related to the measured amount of energy; and
updating the adjusted timetable based upon the threshold value or the tracking of the vehicles.

17. A system, comprising:
a timetable associated with a first vehicle, a second vehicle, and a terminal, wherein the timetable comprises a schedule of a time that the first vehicle and the second vehicle are at least one of arriving or departing the terminal; and
a modify component configured to adjust the timetable to synchronize an overlap of a brake duration of the first vehicle with an acceleration duration of the second vehicle for the terminal.

18. The system of claim 17, wherein the timetable includes at least one of a first vehicle dwell time for the terminal, a first vehicle departure time for the terminal, or a first vehicle speed profile related to the terminal and the first vehicle.

19. The system of claim 18, wherein the timetable includes at least one of a second vehicle dwell time for the terminal, a second vehicle departure time for the terminal, or a second vehicle speed profile related to the terminal and the second vehicle.

20. The system of claim 19, wherein the second vehicle is configured to transfer a portion of energy from the first vehicle based upon the synchronization.

* * * * *

UNITED STATES PATENT AND TRADEMARK OFFICE
CERTIFICATE OF CORRECTION

| | | |
|---|---|---|
| PATENT NO. | : 8,670,890 B2 | Page 1 of 1 |
| APPLICATION NO. | : 13/676279 | |
| DATED | : March 11, 2014 | |
| INVENTOR(S) | : Fournier et al. | |

It is certified that error appears in the above-identified patent and that said Letters Patent is hereby corrected as shown below:

In the Specification

In Column 19, Line 56, delete "fraction energy" and insert -- traction energy --, therefor.

Signed and Sealed this
Thirteenth Day of May, 2014

Michelle K. Lee
*Deputy Director of the United States Patent and Trademark Office*